US008005739B1

(12) United States Patent
Reddy

(10) Patent No.: US 8,005,739 B1
(45) Date of Patent: Aug. 23, 2011

(54) PENSION ALTERNATIVE RETIREMENT INCOME SYSTEM

(76) Inventor: Stephen David Reddy, Enfield, CT (US)

( * ) Notice: Subject to any disclaimer, the term of this patent is extended or adjusted under 35 U.S.C. 154(b) by 957 days.

(21) Appl. No.: 11/820,933

(22) Filed: Jun. 22, 2007

(51) Int. Cl.
*G06Q 40/00* (2006.01)
(52) U.S. Cl. ................................................. 705/36 R
(58) Field of Classification Search ............... 705/36 R
See application file for complete search history.

(56) References Cited

U.S. PATENT DOCUMENTS

| | | | | |
|---|---|---|---|---|
| 4,750,121 A | * | 6/1988 | Halley et al. ........................ | 705/35 |
| 5,136,502 A | * | 8/1992 | Van Remortel et al. ............ | 705/2 |
| 2002/0091610 A1 | * | 7/2002 | Smith ................................. | 705/36 |
| 2003/0078815 A1 | * | 4/2003 | Parsons ............................... | 705/4 |
| 2004/0199446 A1 | * | 10/2004 | Lange ................................. | 705/36 |

* cited by examiner

*Primary Examiner* — James A Kramer
*Assistant Examiner* — Jessica L Lemieux

(57) ABSTRACT

An improved method of funding and delivering benefits to the retired participants of a defined benefit pension plan. The method does this by having the plan purchase cash value life insurance with respect to each retired plan participant, and then entering into separate agreement(s) with institutional third parties to exchange a portion of the future death benefits from those policies for periodic cash payments that could be used to make pension benefit payments to plan participants as they become due. Such modified funding and delivery mechanism could result in significant cost savings to the defined benefit plan as it may be able to deliver more benefits per dollar of contribution to plan assets, thereby improving the financial health and prospects of the defined benefit plan, while also offering sufficient profit potential to other third parties to induce them to play a necessary role in the funding and delivery of plan benefits.

2 Claims, 16 Drawing Sheets

| Year | BOY Account Balance | BOY Deduct for Insur Prem | Deduction for Loan Repay | Deduction for Pension | Bonus For Tax On Loans | Employer Death Benefits | Interest on Account Balance | EOY Account Balance | Insur Cash SurrVal | Total Employer Equity |
|---|---|---|---|---|---|---|---|---|---|---|
| 1 | $ 450,000 | $ 22,829 | $ - | $ - | $ - | $ 208 | $ 40,591 | $ 467,969 | $ 23,724 | $ 449,218 |
| 2 | $ 467,969 | $ 23,930 | $ - | $ - | $ - | $ 226 | $ 42,194 | $ 486,460 | $ 50,236 | $ 450,214 |
| 3 | $ 486,460 | $ 25,060 | $ - | $ - | $ - | $ 247 | $ 43,845 | $ 505,492 | $ 79,698 | $ 453,234 |
| 4 | $ 505,492 | $ 26,214 | $ - | $ - | $ - | $ 271 | $ 45,544 | $ 525,093 | $ 112,246 | $ 458,552 |
| 5 | $ 525,093 | $ 27,386 | $ - | $ - | $ - | $ 298 | $ 47,296 | $ 545,301 | $ 147,998 | $ 466,470 |
| 6 | $ 545,301 | $ 28,569 | $ - | $ - | $ - | $ 328 | $ 49,105 | $ 566,164 | $ 187,048 | $ 477,315 |
| 7 | $ 566,164 | $ 29,755 | $ - | $ - | $ - | $ 359 | $ 50,976 | $ 587,744 | $ 229,472 | $ 491,442 |
| 8 | $ 587,744 | $ 30,936 | $ - | $ - | $ - | $ 392 | $ 52,915 | $ 610,115 | $ 275,321 | $ 509,234 |
| 9 | $ 610,115 | $ 32,102 | $ - | $ - | $ - | $ 423 | $ 54,931 | $ 633,367 | $ 324,687 | $ 531,100 |
| 10 | $ 633,367 | $ 33,249 | $ - | $ - | $ - | $ 455 | $ 57,033 | $ 657,606 | $ 377,606 | $ 557,477 |
| 11 | $ 657,606 | $ 34,368 | $ - | $ - | $ - | $ 489 | $ 59,231 | $ 682,957 | $ 434,077 | $ 588,833 |
| 12 | $ 682,957 | $ 35,447 | $ - | $ - | $ - | $ 523 | $ 61,538 | $ 709,571 | $ 494,056 | $ 625,667 |
| 13 | $ 709,571 | $ 36,474 | $ - | $ - | $ - | $ 559 | $ 63,971 | $ 737,627 | $ 557,448 | $ 668,510 |
| 14 | $ 737,627 | $ 37,434 | $ - | $ - | $ - | $ 823 | $ 66,557 | $ 767,574 | $ 624,107 | $ 718,166 |
| 15 | $ 767,574 | $ 38,310 | $ - | $ - | $ - | $ 1,690 | $ 69,360 | $ 800,314 | $ 693,088 | $ 775,129 |
| 16 | $ 800,314 | $ 39,088 | $ - | $ - | $ - | $ 2,896 | $ 72,454 | $ 836,577 | $ 763,696 | $ 840,004 |
| 17 | $ 836,577 | $ 39,748 | $ - | $ - | $ - | $ 4,432 | $ 75,909 | $ 877,170 | $ 835,237 | $ 913,489 |
| 18 | $ 877,170 | $ 40,275 | $ - | $ - | $ - | $ 6,340 | $ 79,806 | $ 923,042 | $ 906,920 | $ 996,329 |
| 19 | $ 923,042 | $ 40,652 | $ - | $ - | $ - | $ 8,663 | $ 84,238 | $ 975,290 | $ 977,856 | $ 1,089,317 |
| 20 | $ 975,290 | $ 40,865 | $ - | $ - | $ - | $ 11,740 | $ 89,328 | $ 1,035,494 | $ 1,047,072 | $ 1,193,617 |
| 21 | $ 1,035,494 | $ 40,897 | $ - | $ - | $ - | $ 15,693 | $ 95,232 | $ 1,105,522 | $ 1,112,840 | $ 1,309,891 |
| 22 | $ 1,105,522 | $ 40,738 | $ - | $ - | $ - | $ 20,292 | $ 102,118 | $ 1,187,194 | $ 1,173,858 | $ 1,439,122 |
| 23 | $ 1,187,194 | $ 40,378 | $ - | $ - | $ - | $ 25,538 | $ 110,161 | $ 1,282,515 | $ 1,228,790 | $ 1,582,365 |
| 24 | $ 1,282,515 | $ 39,808 | $ - | $ - | $ - | $ 31,852 | $ 119,570 | $ 1,394,130 | $ 1,274,780 | $ 1,740,759 |
| 25 | $ 1,394,130 | $ 38,981 | $ - | $ - | $ - | $ 38,899 | $ 130,587 | $ 1,524,635 | $ 1,310,070 | $ 1,915,527 |
| 26 | $ 1,524,635 | $ 37,890 | $ - | $ - | $ - | $ 46,578 | $ 143,453 | $ 1,676,776 | $ 1,333,049 | $ 2,107,988 |
| 27 | $ 1,676,776 | $ 36,538 | $ - | $ - | $ - | $ 55,305 | $ 158,450 | $ 1,853,993 | $ 1,340,741 | $ 2,339,577 |
| 28 | $ 1,853,993 | $ 34,892 | $ - | $ - | $ - | $ 64,328 | $ 175,870 | $ 2,059,299 | $ 1,331,987 | $ 2,551,844 |
| 29 | $ 2,059,299 | $ 32,971 | $ - | $ - | $ - | $ 72,219 | $ 195,932 | $ 2,294,479 | $ 1,308,921 | $ 2,806,483 |
| 30 | $ 2,294,479 | $ 30,869 | $ - | $ - | $ - | $ 79,623 | $ 218,825 | $ 2,562,059 | $ 1,271,834 | $ 3,085,379 |
| 31 | $ 2,562,059 | $ 28,621 | $ - | $ - | $ - | $ 86,239 | $ 244,773 | $ 2,864,450 | $ 1,221,503 | $ 3,390,611 |
| 32 | $ 2,864,450 | $ 26,268 | $ - | $ - | $ - | $ 91,773 | $ 273,986 | $ 3,203,941 | $ 1,159,180 | $ 3,724,481 |
| 33 | $ 3,203,941 | $ 23,856 | $ - | $ - | $ - | $ 95,971 | $ 306,667 | $ 3,582,722 | $ 1,086,536 | $ 4,089,535 |
| 34 | $ 3,582,722 | $ 21,428 | $ - | $ - | $ - | $ 104,951 | $ 343,308 | $ 4,009,554 | $ 992,527 | $ 4,488,630 |
| 35 | $ 4,009,554 | $ 18,792 | $ - | $ - | $ - | $ 111,670 | $ 384,427 | $ 4,486,857 | $ 879,796 | $ 4,924,793 |
| 36 | $ 4,486,857 | $ 16,024 | $ - | $ - | $ - | $ 115,281 | $ 430,205 | $ 5,016,319 | $ 752,521 | $ 5,401,378 |
| 37 | $ 5,016,319 | $ 13,212 | $ - | $ - | $ - | $ 114,929 | $ 480,754 | $ 5,598,791 | $ 616,513 | $ 5,922,102 |
| 38 | $ 5,598,791 | $ 10,457 | $ - | $ - | $ - | $ 109,900 | $ 536,112 | $ 6,234,346 | $ 479,091 | $ 6,491,090 |
| 39 | $ 6,234,346 | $ 7,870 | $ - | $ - | $ - | $ 94,119 | $ 595,986 | $ 6,916,581 | $ 359,047 | $ 7,112,805 |
| 40 | $ 6,916,581 | $ 5,723 | $ - | $ - | $ - | $ 221,475 | $ 667,052 | $ 7,799,385 | $ - | $ 7,799,385 |

FIG. 3

| policy year | Face Amount | BOY Death Benefit | BOY Account Balance | Premium Income | Invest Income | COI Charges | Exp Chrgs | EOY Death Benefit | EOY Account Balance | NAAR |
|---|---|---|---|---|---|---|---|---|---|---|
| 1 | $ 40,767 | $ 40,767 | $ 22,145 | $ 22,145 | $ 2,028 | $ 204 | $ - | $ 40,767 | $ 23,968 | $ 18,622 |
| 2 | $ 83,939 | $ 83,939 | $ 47,420 | $ 23,451 | $ 4,342 | $ 437 | $ - | $ 83,939 | $ 51,325 | $ 36,519 |
| 3 | $ 129,658 | $ 129,658 | $ 76,160 | $ 24,835 | $ 6,974 | $ 702 | $ - | $ 129,658 | $ 82,432 | $ 53,499 |
| 4 | $ 178,075 | $ 178,075 | $ 108,732 | $ 26,300 | $ 9,957 | $ 1,005 | $ - | $ 178,075 | $ 117,684 | $ 69,343 |
| 5 | $ 229,348 | $ 229,348 | $ 145,535 | $ 27,852 | $ 13,327 | $ 1,345 | $ - | $ 229,348 | $ 157,518 | $ 83,813 |
| 6 | $ 283,647 | $ 283,647 | $ 187,013 | $ 29,495 | $ 17,126 | $ 1,716 | $ - | $ 283,647 | $ 202,423 | $ 96,634 |
| 7 | $ 341,149 | $ 341,149 | $ 233,658 | $ 31,235 | $ 21,400 | $ 2,108 | $ - | $ 341,149 | $ 252,950 | $ 107,491 |
| 8 | $ 402,044 | $ 402,044 | $ 286,028 | $ 33,078 | $ 26,199 | $ 2,508 | $ - | $ 402,044 | $ 309,719 | $ 116,016 |
| 9 | $ 466,531 | $ 466,531 | $ 344,748 | $ 35,030 | $ 31,585 | $ 2,876 | $ - | $ 466,531 | $ 373,457 | $ 121,783 |
| 10 | $ 534,823 | $ 534,823 | $ 410,553 | $ 37,096 | $ 37,624 | $ 3,198 | $ - | $ 534,823 | $ 444,978 | $ 124,270 |
| 11 | $ 607,145 | $ 607,145 | $ 484,263 | $ 39,285 | $ 44,394 | $ 3,443 | $ - | $ 607,145 | $ 525,214 | $ 122,881 |
| 12 | $ 683,733 | $ 683,733 | $ 566,817 | $ 41,603 | $ 51,983 | $ 3,565 | $ - | $ 689,064 | $ 615,235 | $ 116,916 |
| 13 | $ 764,840 | $ 764,840 | $ 659,293 | $ 44,057 | $ 60,494 | $ 3,502 | $ - | $ 795,076 | $ 716,284 | $ 105,548 |
| 14 | $ 850,733 | $ 850,733 | $ 762,941 | $ 46,657 | $ 70,045 | $ 3,171 | $ - | $ 912,797 | $ 829,815 | $ 87,792 |
| 15 | $ 941,693 | $ 967,147 | $ 879,225 | $ 49,410 | $ 80,730 | $ 3,455 | $ - | $ 1,042,584 | $ 956,499 | $ 87,922 |
| 16 | $ 1,038,020 | $ 1,099,618 | $ 1,008,824 | $ 52,325 | $ 92,633 | $ 3,880 | $ - | $ 1,185,383 | $ 1,097,577 | $ 90,794 |
| 17 | $ 1,140,030 | $ 1,245,228 | $ 1,152,989 | $ 55,412 | $ 105,878 | $ 4,283 | $ - | $ 1,342,405 | $ 1,254,584 | $ 92,239 |
| 18 | $ 1,248,058 | $ 1,405,194 | $ 1,313,265 | $ 58,681 | $ 120,607 | $ 4,632 | $ - | $ 1,514,996 | $ 1,429,241 | $ 91,929 |
| 19 | $ 1,362,461 | $ 1,580,868 | $ 1,491,385 | $ 62,143 | $ 136,983 | $ 4,885 | $ - | $ 1,704,656 | $ 1,623,482 | $ 89,483 |
| 20 | $ 1,483,613 | $ 1,773,756 | $ 1,689,292 | $ 65,810 | $ 155,185 | $ 4,990 | $ - | $ 1,931,461 | $ 1,839,487 | $ 84,465 |
| 21 | $ 1,611,913 | $ 2,004,639 | $ 1,909,180 | $ 69,693 | $ 175,364 | $ 6,094 | $ - | $ 2,182,373 | $ 2,078,450 | $ 95,459 |
| 22 | $ 1,747,783 | $ 2,259,867 | $ 2,152,255 | $ 73,804 | $ 197,666 | $ 7,412 | $ - | $ 2,459,634 | $ 2,342,509 | $ 107,613 |
| 23 | $ 1,891,669 | $ 2,541,701 | $ 2,420,668 | $ 78,159 | $ 222,288 | $ 8,983 | $ - | $ 2,765,672 | $ 2,633,973 | $ 121,033 |
| 24 | $ 2,044,044 | $ 2,852,581 | $ 2,716,744 | $ 82,770 | $ 249,434 | $ 11,001 | $ - | $ 3,102,936 | $ 2,955,177 | $ 135,837 |
| 25 | $ 2,205,410 | $ 3,194,973 | $ 3,042,831 | $ 87,654 | $ 279,323 | $ 13,432 | $ - | $ 3,474,158 | $ 3,308,722 | $ 152,142 |
| 26 | $ 2,376,296 | $ 3,571,624 | $ 3,401,547 | $ 92,825 | $ 312,190 | $ 16,349 | $ - | $ 3,882,257 | $ 3,697,388 | $ 170,077 |
| 27 | $ 2,557,264 | $ 3,985,474 | $ 3,795,690 | $ 98,302 | $ 348,281 | $ 20,046 | $ - | $ 4,330,121 | $ 4,123,925 | $ 189,784 |
| 28 | $ 2,748,909 | $ 4,439,428 | $ 4,228,027 | $ 104,102 | $ 387,853 | $ 24,471 | $ - | $ 4,820,979 | $ 4,591,408 | $ 211,401 |
| 29 | $ 2,951,862 | $ 4,936,735 | $ 4,701,652 | $ 110,244 | $ 431,204 | $ 29,297 | $ - | $ 5,358,737 | $ 5,103,559 | $ 235,083 |
| 30 | $ 3,166,789 | $ 5,481,323 | $ 5,220,307 | $ 116,748 | $ 478,662 | $ 34,929 | $ - | $ 5,947,242 | $ 5,664,040 | $ 261,015 |
| 31 | $ 3,394,396 | $ 6,077,060 | $ 5,787,676 | $ 123,636 | $ 530,558 | $ 41,476 | $ - | $ 6,590,596 | $ 6,276,758 | $ 289,384 |
| 32 | $ 3,635,433 | $ 6,728,073 | $ 6,407,689 | $ 130,931 | $ 587,251 | $ 49,058 | $ - | $ 7,293,175 | $ 6,945,881 | $ 320,384 |
| 33 | $ 3,890,690 | $ 7,438,764 | $ 7,084,537 | $ 138,656 | $ 649,118 | $ 57,808 | $ - | $ 8,059,640 | $ 7,675,847 | $ 354,227 |
| 34 | $ 4,161,008 | $ 8,213,818 | $ 7,822,684 | $ 146,837 | $ 716,363 | $ 72,260 | $ - | $ 8,890,126 | $ 8,466,787 | $ 391,134 |
| 35 | $ 4,447,274 | $ 9,053,401 | $ 8,622,287 | $ 155,500 | $ 789,097 | $ 90,290 | $ - | $ 9,787,148 | $ 9,321,094 | $ 431,114 |
| 36 | $ 4,750,430 | $ 9,960,056 | $ 9,485,768 | $ 164,674 | $ 867,497 | $ 112,907 | $ - | $ 10,752,376 | $ 10,240,358 | $ 474,288 |
| 37 | $ 5,071,472 | $ 10,935,485 | $ 10,414,748 | $ 174,390 | $ 951,652 | $ 141,404 | $ - | $ 11,786,246 | $ 11,224,996 | $ 520,737 |
| 38 | $ 5,411,456 | $ 11,980,159 | $ 11,409,675 | $ 184,679 | $ 1,041,529 | $ 177,422 | $ - | $ 12,887,471 | $ 12,273,782 | $ 570,484 |
| 39 | $ 5,771,499 | $ 13,092,825 | $ 12,469,357 | $ 195,575 | $ 1,137,519 | $ 210,043 | $ - | $ 14,066,674 | $ 13,396,833 | $ 623,468 |
| 40 | $ 6,152,784 | $ 14,284,144 | $ 13,603,947 | $ 207,114 | $ 1,217,927 | $ 731,212 | $ - | $ 14,795,195 | $ 14,090,662 | $ 680,197 |

FIG. 4

| policy year | annual pension | Annual Guarantor Loan | Cum Loan with Int | BOY Gmtor Death Benefit | BOY Plan Death Benefit | Total BOY Death Benefit | BOY Gmtor Death Benefit | BOY Plan Death Benefit | Total EOY Death Benefit | BOY Gmtor DB Shortfall | EOY Gmtor DB Shortfall |
|---|---|---|---|---|---|---|---|---|---|---|---|
| 1 | $ - | $ 41,700 | $ 42,913 | $ - | $ 40,767 | $ 40,767 | $ 40,767 | $ - | $ 40,767 | $ - | $ 2,146 |
| 2 | $ - | $ 41,700 | $ 88,357 | $ 42,913 | $ 41,027 | $ 83,939 | $ 83,939 | $ - | $ 83,939 | $ - | $ 4,418 |
| 3 | $ - | $ 41,700 | $ 136,482 | $ 88,357 | $ 41,301 | $ 129,658 | $ 129,658 | $ - | $ 129,658 | $ - | $ 6,824 |
| 4 | $ - | $ 41,700 | $ 187,447 | $ 136,482 | $ 41,593 | $ 178,075 | $ 178,075 | $ - | $ 178,075 | $ - | $ 9,372 |
| 5 | $ - | $ 41,700 | $ 241,419 | $ 187,447 | $ 41,901 | $ 229,348 | $ 229,348 | $ - | $ 229,348 | $ - | $ 12,071 |
| 6 | $ - | $ 41,700 | $ 298,576 | $ 241,419 | $ 42,227 | $ 283,647 | $ 283,647 | $ - | $ 283,647 | $ - | $ 14,929 |
| 7 | $ - | $ 41,700 | $ 359,104 | $ 298,576 | $ 42,573 | $ 341,149 | $ 341,149 | $ - | $ 341,149 | $ - | $ 17,955 |
| 8 | $ - | $ 41,700 | $ 423,204 | $ 359,104 | $ 42,939 | $ 402,044 | $ 402,044 | $ - | $ 402,044 | $ - | $ 21,160 |
| 9 | $ - | $ 41,700 | $ 491,085 | $ 423,204 | $ 43,327 | $ 466,531 | $ 466,531 | $ - | $ 466,531 | $ - | $ 24,554 |
| 10 | $ - | $ 41,700 | $ 562,972 | $ 491,085 | $ 43,738 | $ 534,823 | $ 534,823 | $ - | $ 534,823 | $ - | $ 28,149 |
| 11 | $ - | $ 41,700 | $ 639,100 | $ 562,972 | $ 44,173 | $ 607,145 | $ 607,145 | $ - | $ 607,145 | $ - | $ 31,955 |
| 12 | $ - | $ 41,700 | $ 719,719 | $ 639,100 | $ 44,633 | $ 683,733 | $ 689,064 | $ - | $ 689,064 | $ - | $ 30,656 |
| 13 | $ - | $ 41,700 | $ 805,095 | $ 719,719 | $ 45,121 | $ 764,840 | $ 795,076 | $ - | $ 795,076 | $ - | $ 10,019 |
| 14 | $ - | $ 41,700 | $ 895,508 | $ 805,095 | $ 45,638 | $ 850,733 | $ 895,508 | $ 17,289 | $ 912,797 | $ - | $ - |
| 15 | $ - | $ 41,700 | $ 991,256 | $ 895,508 | $ 71,639 | $ 967,147 | $ 991,256 | $ 51,329 | $ 1,042,584 | $ - | $ - |
| 16 | $ - | $ 41,700 | $ 1,092,652 | $ 991,256 | $ 108,363 | $ 1,099,618 | $ 1,092,652 | $ 92,731 | $ 1,185,383 | $ - | $ - |
| 17 | $ - | $ 41,700 | $ 1,200,031 | $ 1,092,652 | $ 152,576 | $ 1,245,228 | $ 1,200,031 | $ 142,374 | $ 1,342,405 | $ - | $ - |
| 18 | $ - | $ 41,700 | $ 1,313,746 | $ 1,200,031 | $ 205,163 | $ 1,405,194 | $ 1,313,746 | $ 201,250 | $ 1,514,996 | $ - | $ - |
| 19 | $ - | $ 41,700 | $ 1,434,169 | $ 1,313,746 | $ 267,122 | $ 1,580,868 | $ 1,434,169 | $ 270,487 | $ 1,704,656 | $ - | $ - |
| 20 | $ - | $ 41,700 | $ 1,561,698 | $ 1,434,169 | $ 339,587 | $ 1,773,756 | $ 1,561,698 | $ 369,764 | $ 1,931,461 | $ - | $ - |
| 21 | $ - | $ 41,700 | $ 1,696,750 | $ 1,561,698 | $ 442,941 | $ 2,004,639 | $ 1,696,750 | $ 485,622 | $ 2,182,373 | $ - | $ - |
| 22 | $ - | $ 41,700 | $ 1,839,771 | $ 1,696,750 | $ 563,117 | $ 2,259,867 | $ 1,839,771 | $ 619,863 | $ 2,459,634 | $ - | $ - |
| 23 | $ - | $ 41,700 | $ 1,991,230 | $ 1,839,771 | $ 701,930 | $ 2,541,701 | $ 1,991,230 | $ 774,442 | $ 2,765,672 | $ - | $ - |
| 24 | $ - | $ 41,700 | $ 2,151,625 | $ 1,991,230 | $ 861,350 | $ 2,852,581 | $ 2,151,625 | $ 951,311 | $ 3,102,936 | $ - | $ - |
| 25 | $ - | $ 41,700 | $ 2,321,484 | $ 2,151,625 | $ 1,043,347 | $ 3,194,973 | $ 2,321,484 | $ 1,152,674 | $ 3,474,158 | $ - | $ - |
| 26 | $ - | $ 41,700 | $ 2,501,364 | $ 2,321,484 | $ 1,250,141 | $ 3,571,624 | $ 2,501,364 | $ 1,380,893 | $ 3,882,257 | $ - | $ - |
| 27 | $ - | $ 41,700 | $ 2,691,857 | $ 2,501,364 | $ 1,484,110 | $ 3,985,474 | $ 2,691,857 | $ 1,638,264 | $ 4,330,121 | $ - | $ - |
| 28 | $ - | $ 41,700 | $ 2,893,589 | $ 2,691,857 | $ 1,747,571 | $ 4,439,428 | $ 2,893,589 | $ 1,927,390 | $ 4,820,979 | $ - | $ - |
| 29 | $ - | $ 41,700 | $ 3,107,223 | $ 2,893,589 | $ 2,043,146 | $ 4,936,735 | $ 3,107,223 | $ 2,251,514 | $ 5,358,737 | $ - | $ - |
| 30 | $ - | $ 41,700 | $ 3,333,462 | $ 3,107,223 | $ 2,374,099 | $ 5,481,323 | $ 3,333,462 | $ 2,613,780 | $ 5,947,242 | $ - | $ - |
| 31 | $ - | $ 41,700 | $ 3,573,049 | $ 3,333,462 | $ 2,743,598 | $ 6,077,060 | $ 3,573,049 | $ 3,017,547 | $ 6,590,596 | $ - | $ - |
| 32 | $ - | $ 41,700 | $ 3,826,771 | $ 3,573,049 | $ 3,155,024 | $ 6,728,073 | $ 3,826,771 | $ 3,466,404 | $ 7,293,175 | $ - | $ - |
| 33 | $ - | $ 41,700 | $ 4,095,463 | $ 3,826,771 | $ 3,611,993 | $ 7,438,764 | $ 4,095,463 | $ 3,964,177 | $ 8,059,640 | $ - | $ - |
| 34 | $ - | $ 41,700 | $ 4,380,008 | $ 4,095,463 | $ 4,118,355 | $ 8,213,818 | $ 4,380,008 | $ 4,510,118 | $ 8,890,126 | $ - | $ - |
| 35 | $ - | $ 41,700 | $ 4,681,341 | $ 4,380,008 | $ 4,673,393 | $ 9,053,401 | $ 4,681,341 | $ 5,105,807 | $ 9,787,148 | $ - | $ - |
| 36 | $ - | $ 41,700 | $ 5,000,453 | $ 4,681,341 | $ 5,278,715 | $ 9,960,056 | $ 5,000,453 | $ 5,751,923 | $ 10,752,376 | $ - | $ - |
| 37 | $ - | $ 41,700 | $ 5,338,392 | $ 5,000,453 | $ 5,935,033 | $ 10,935,485 | $ 5,338,392 | $ 6,447,854 | $ 11,786,246 | $ - | $ - |
| 38 | $ - | $ 41,700 | $ 5,696,269 | $ 5,338,392 | $ 6,641,767 | $ 11,980,159 | $ 5,696,269 | $ 7,191,202 | $ 12,887,471 | $ - | $ - |
| 39 | $ - | $ 41,700 | $ 6,075,262 | $ 5,696,269 | $ 7,396,556 | $ 13,092,825 | $ 6,075,262 | $ 7,991,412 | $ 14,066,674 | $ - | $ - |
| 40 | $ - | $ 41,700 | $ 6,476,615 | $ 6,075,262 | $ 8,208,882 | $ 14,284,144 | $ 6,476,615 | $ 8,318,580 | $ 14,795,195 | $ - | $ - |

FIG. 5

| policy year | Employee Pension Benefit | Tax Benefit On Pension | Swap Payment Received | Tax on Swap Payment Received | Arm Loan to Guarantor | Insurance Premium | Tax on Death Ben Exposure | Death Benefit Received | Loan Repaid by Guarantor | Loan Repaid by Plan | Tax on Loan Repaid by Plan | Tax Benefit On Loan Interest | Pre-Tax Net CF to Guarantor | After-Tax Net CF to Guarantor |
|---|---|---|---|---|---|---|---|---|---|---|---|---|---|---|
| 1 | $ 49,745 | $ 17,411 | $ 262 | $ 92 | $ 49,745 | $ 262 | | $ 262 | $ 262 | | | $ 514 | $ (0) | $ 17,833 |
| 2 | $ 49,215 | $ 17,225 | $ 867 | $ 303 | $ 49,215 | $ 867 | | $ 867 | $ 867 | | | $ 1,554 | $ 0 | $ 18,476 |
| 3 | $ 48,641 | $ 17,024 | $ 1,611 | $ 564 | $ 48,641 | $ 1,611 | | $ 1,611 | $ 1,611 | | | $ 2,630 | $ 0 | $ 19,091 |
| 4 | $ 48,016 | $ 16,806 | $ 2,533 | $ 886 | $ 48,016 | $ 2,533 | | $ 2,533 | $ 2,533 | | | $ 3,741 | - | $ 19,660 |
| 5 | $ 47,334 | $ 16,567 | $ 3,661 | $ 1,281 | $ 47,334 | $ 3,661 | | $ 3,661 | $ 3,661 | | | $ 4,882 | - | $ 20,168 |
| 6 | $ 46,590 | $ 16,307 | $ 5,024 | $ 1,758 | $ 46,590 | $ 5,024 | | $ 5,024 | $ 5,024 | | | $ 6,051 | - | $ 20,599 |
| 7 | $ 45,781 | $ 16,023 | $ 6,648 | $ 2,327 | $ 45,781 | $ 6,648 | | $ 6,648 | $ 6,648 | | | $ 7,242 | - | $ 20,938 |
| 8 | $ 44,903 | $ 15,716 | $ 8,557 | $ 2,995 | $ 44,903 | $ 8,557 | | $ 8,557 | $ 8,557 | | | $ 8,449 | - | $ 21,170 |
| 9 | $ 43,959 | $ 15,386 | $ 10,704 | $ 3,746 | $ 43,959 | $ 10,704 | | $ 10,704 | $ 10,704 | | | $ 9,666 | - | $ 21,305 |
| 10 | $ 42,950 | $ 15,033 | $ 13,154 | $ 4,604 | $ 42,950 | $ 13,154 | | $ 13,154 | $ 13,154 | | | $ 10,888 | - | $ 21,317 |
| 11 | $ 41,877 | $ 14,657 | $ 15,940 | $ 5,579 | $ 41,877 | $ 15,940 | | $ 15,940 | $ 15,940 | | | $ 12,107 | - | $ 21,185 |
| 12 | $ 40,738 | $ 14,258 | $ 19,096 | $ 6,684 | $ 40,738 | $ 19,096 | | $ 19,096 | $ 19,096 | | | $ 13,314 | - | $ 20,888 |
| 13 | $ 39,532 | $ 13,836 | $ 22,659 | $ 7,931 | $ 39,532 | $ 22,659 | | $ 22,659 | $ 22,659 | | | $ 14,498 | - | $ 20,403 |
| 14 | $ 38,259 | $ 13,391 | $ 26,657 | $ 9,330 | $ 38,259 | $ 26,657 | | $ 26,657 | $ 26,657 | | | $ 15,648 | - | $ 19,709 |
| 15 | $ 36,918 | $ 12,921 | $ 31,101 | $ 10,885 | $ 36,918 | $ 31,101 | | $ 31,101 | $ 31,101 | | | $ 16,753 | - | $ 18,789 |
| 16 | $ 35,510 | $ 12,429 | $ 35,990 | $ 12,597 | $ 35,510 | $ 35,990 | | $ 35,990 | $ 35,990 | | | $ 17,798 | - | $ 17,630 |
| 17 | $ 34,039 | $ 11,914 | $ 41,308 | $ 14,458 | $ 34,039 | $ 41,308 | | $ 41,308 | $ 41,308 | | | $ 18,769 | - | $ 16,225 |
| 18 | $ 32,507 | $ 11,378 | $ 47,023 | $ 16,458 | $ 32,507 | $ 47,023 | | $ 47,023 | $ 47,023 | | | $ 19,663 | - | $ 14,573 |
| 19 | $ 30,922 | $ 10,823 | $ 53,091 | $ 18,582 | $ 30,922 | $ 53,091 | | $ 53,091 | $ 53,091 | | | $ 20,436 | - | $ 12,677 |
| 20 | $ 29,288 | $ 10,251 | $ 59,451 | $ 20,808 | $ 29,288 | $ 59,451 | | $ 59,451 | $ 59,451 | | | $ 21,103 | - | $ 10,546 |
| 21 | $ 27,616 | $ 9,666 | $ 66,032 | $ 23,111 | $ 27,616 | $ 66,032 | | $ 66,032 | $ 66,032 | | | $ 21,642 | - | $ 8,197 |
| 22 | $ 25,913 | $ 9,070 | $ 72,738 | $ 25,458 | $ 25,913 | $ 72,738 | | $ 72,738 | $ 72,738 | | | $ 22,041 | - | $ 5,652 |
| 23 | $ 24,191 | $ 8,467 | $ 79,458 | $ 27,810 | $ 24,191 | $ 79,458 | | $ 79,458 | $ 79,458 | | | $ 22,289 | - | $ 2,946 |
| 24 | $ 22,447 | $ 7,857 | $ 87,288 | $ 30,551 | $ 22,447 | $ 87,288 | | $ 87,288 | $ 87,288 | | | $ 22,366 | - | $ (328) |
| 25 | $ 20,683 | $ 7,239 | $ 95,006 | $ 33,252 | $ 20,683 | $ 95,006 | | $ 95,006 | $ 95,006 | | | $ 22,251 | - | $ (3,762) |
| 26 | $ 18,912 | $ 6,619 | $ 102,374 | $ 35,831 | $ 18,912 | $ 102,374 | | $ 102,374 | $ 102,374 | | | $ 21,937 | - | $ (7,275) |
| 27 | $ 17,141 | $ 5,999 | $ 110,294 | $ 38,603 | $ 17,141 | $ 110,294 | | $ 110,294 | $ 110,294 | | | $ 21,410 | - | $ (11,194) |
| 28 | $ 15,380 | $ 5,383 | $ 117,230 | $ 41,030 | $ 15,380 | $ 117,230 | | $ 117,230 | $ 117,230 | | | $ 20,661 | - | $ (14,986) |
| 29 | $ 13,664 | $ 4,783 | $ 120,995 | $ 42,348 | $ 13,664 | $ 120,995 | | $ 120,995 | $ 120,995 | | | $ 19,721 | - | $ (17,845) |
| 30 | $ 12,025 | $ 4,209 | $ 123,279 | $ 43,148 | $ 12,025 | $ 123,279 | | $ 123,279 | $ 123,279 | | | $ 18,628 | - | $ (20,311) |
| 31 | $ 10,479 | $ 3,668 | $ 123,961 | $ 43,386 | $ 10,479 | $ 123,961 | | $ 123,961 | $ 123,961 | | | $ 17,406 | - | $ (22,313) |
| 32 | $ 9,037 | $ 3,163 | $ 122,975 | $ 43,041 | $ 9,037 | $ 122,975 | | $ 122,975 | $ 122,975 | | | $ 16,084 | - | $ (23,794) |
| 33 | $ 7,711 | $ 2,699 | $ 120,329 | $ 42,115 | $ 7,711 | $ 120,329 | | $ 120,329 | $ 120,329 | | | $ 14,692 | - | $ (24,724) |
| 34 | $ 6,469 | $ 2,264 | $ 123,609 | $ 43,263 | $ 6,469 | $ 123,609 | | $ 123,609 | $ 123,609 | | | $ 13,187 | - | $ (27,811) |
| 35 | $ 5,290 | $ 1,852 | $ 124,068 | $ 43,424 | $ 5,290 | $ 124,068 | | $ 124,068 | $ 124,068 | | | $ 11,529 | - | $ (30,043) |
| 36 | $ 4,197 | $ 1,469 | $ 121,324 | $ 42,463 | $ 4,197 | $ 121,324 | | $ 121,324 | $ 121,324 | | | $ 9,773 | - | $ (20,311) |
| 37 | $ 3,210 | $ 1,124 | $ 115,057 | $ 40,270 | $ 3,210 | $ 115,057 | | $ 115,057 | $ 115,057 | | | $ 7,982 | - | $ (31,164) |
| 38 | $ 2,349 | $ 822 | $ 105,117 | $ 36,791 | $ 2,349 | $ 105,117 | | $ 105,117 | $ 105,117 | | | $ 6,234 | - | $ (29,735) |
| 39 | $ 1,646 | $ 576 | $ 86,330 | $ 30,216 | $ 1,646 | $ 86,330 | | $ 86,330 | $ 86,330 | | | $ 4,660 | - | $ (24,980) |
| 40 | $ 670 | $ 235 | $ 201,679 | $ 70,588 | $ 670 | $ 201,679 | | $ 201,679 | $ 201,679 | | | $ 2,023 | - | $ (68,331) |
| | $ 1,075,756 | $ 376,514 | $ 2,624,479 | $ 918,568 | $ 1,075,756 | $ 2,624,479 | | $ 2,624,479 | $ 2,624,479 | - | - | $ 542,212 | $ 0 | $ 159 |

Benefits Summary

| Current Fund Balance | $ 450,000 |
| --- | --- |
| Annual Pension | $ 50,000 |
| Loan/Pension Benefit Ratio | 83.4% |
| COLA% | 0% |
| DB Shortfall Repaid by Plan | 0 |

| Upfront Guarantor Payment | $ - |
| --- | --- |
| Guarantor Tax Rate | 35% |
| Guarantor Discount Rate | 5.90% |
| Guarantor Loan Int Deduct % | 100.00% |
| DB tax Index | 6 |

|  | PARIS | Pension | Diff | % Diff |
| --- | --- | --- | --- | --- |
| Initial Plan Balance | $ 450,000 | $ 450,000 | $ - | 0.0% |
| Minimum Plan Balance | $ 50,000 | $ 240,166 | $ 209,834 | 87.4% |
| Final Plan Balance | $ 7,799,385 | $ 598,179 | $ 7,201,206 | 1203.9% |
| Minimum Plan Equity | $ 449,218 | $ 240,166 | $ 209,053 | 87.0% |
| Final Plan Equity | $ 7,799,385 | $ 598,179 | $ 7,201,206 | 1203.9% |
| EOY Plan Balance Yr 2 | $ 453,234 | $ 420,939 | $ 32,294 | 7.7% |
| EOY Plan Balance Yr 5 | $ 477,315 | $ 389,262 | $ 88,053 | 22.6% |
| EOY Plan Balance Yr 10 | $ 557,477 | $ 344,856 | $ 212,621 | 61.7% |
| Avg Collateral Required | $ 26,570 | | | |
| Max Collateral Required | $ 102,268 | | | |
| Max Collateral Shortfall | $ - | | | |
| Non-Equity Split Dollar | TRUE | | | |

Guarantor Cash Flows

| Guarantor Cash Flows | Undisc CF | Disc CF |
| --- | --- | --- |
| Death Benefits Received | $ 2,186,763 | $ 476,815 |
| Loan Proceeds Received | $ 897,180 | $ 477,670 |
| DB Shortfall from Plan | $ (1,075,756) | $ (572,746) |
| Pension Benefits Paid | $ (2,188,816) | $ (478,072) |
| Loans Repaid by Guarantor | $ - | $ - |
| Upfront Payment | $ - | $ - |
| Net Pre-Tax Cash Flow | $ (180,628) | $ (96,332) |
| Tax on Upfront Payment | $ - | $ - |
| Tax on Benefits Paid | $ 376,514 | $ 200,461 |
| Tax on Swap Payments Rcvd | $ (404,529) | $ (70,553) |
| Tax on Loan Interest | $ 452,205 | $ 146,899 |
| Tax on DB Coverage | $ - | $ - |
| Tax on Loan Repaid by Plan | $ - | $ - |
| Net Tax Cash Flows | $ 424,190 | $ 276,807 |
| Net After-Tax Cash Flow | $ 243,562 | $ 180,475 |

Insurance Summary

| Actual/Expected qx | 100% |
| --- | --- |
| Face Amount (as % of cum loan) | 95% |
| Death Benefit Option (1 or 2) | 1 |
| Prem/Face Ratio | 0.56 |
| Premium Years | 40 |
| Insurer Tax Rate | 35% |
| Death Benefits Shared (0 or 1) | 1 |
| Full Years in Force | 40 |

| Premium Load % | 3% |
| --- | --- |
| Expense Charge per $1000 | 0 |
| Credited Rate Spread | 0.30% |
| COI load % | 7.5% |
| Surr Chrg % | 0% |
| Surrender Rate% | 0.00% |
| No Lapse Guarantee | 0 |
| No Lapse Guar Prem% | 10% |

Insurer Cash Flows

| Insurer Cash Flows | Undisc CF | Disc CF |
| --- | --- | --- |
| Insurer Discount Rate | 0.00% | 5.00% |
| PV Premium Load | $ 34,933 | $ 16,056 |
| PV Exp Chg Load | $ - | $ - |
| PV Credited Rate Load | $ 86,128 | $ 28,722 |
| PV COI Load | $ 13,311 | $ 4,011 |
| PV Pre-tax Loads | $ 134,372 | $ 48,789 |
| PV After-tax Loads | $ 87,342 | $ 31,713 |

Rate & Loan Summary

| Plan/Insurer Earned Rate | 9.50% |
| --- | --- |
| Insurance Credited Rate | 9.20% |
| Loan Int Rate | 5.90% |
| Lender Cost of Funds | 5.40% |
| LIBOR | 5.00% |

| Earned Rate Sprd to LIBOR | 4.50% |
| --- | --- |
| Insurance Credited Rate Sprd to LIBOR | 4.20% |
| Loan Rate Sprd to LIBOR | 0.90% |
| Lender COF Sprd to LIBOR | 0.40% |
| Lender Tax Rate | 35% |

Lender Cash Flows

| Lender Cash Flows | Undisc CF | Disc CF |
| --- | --- | --- |
| Lender Discount Rate | 0.00% | 5.00% |
| Pre-tax Spread Arbitrage | $ 1,351,563 | $ 422,216 |
| PV Pre-tax Lender Load | $ 204,785 | $ 63,972 |
| PV After-tax Lender Load | $ 133,110 | $ 41,582 |
| PV Pre-tax Guarantor & Lender Loads | $ 24,157 | $ (32,360) |

FIG. 10

PENSION ALTERNATIVE RETIREMENT INCOME SYSTEM

CROSS-REFERENCE TO RELATED APPLICATIONS

None.

FEDERALLY SPONSORED RESEARCH

None

SEQUENCE LISTING

None

BACKGROUND OF THE INVENTION

1. Field of the Invention

This invention relates to a method of funding and delivering retirement benefits promised as part of a defined benefit pension plan, such method of funding and delivering benefits having inherent advantages which help reduce the cost to the plan sponsor and reduce the risk of failure of the plan itself.

2. Background of the Invention

Defined Benefit Pension Plans (which will be referred to hereafter as "DB plans") have traditionally played a vital role in providing retirement income for many senior citizens. These plans typically pay a regular income stream, or pension, to employees after they had worked for one company for many years, sometimes decades. The amount of the payments are usually determined based on the number of years of service by the employees, as well as their average income during the final years of their employment.

In recent years these plans have been falling out of favor with employers because of the high cost of providing the retirement benefits associated with them. The high cost is further exacerbated by the fact there is a lot of uncertainty as to what the total cost of providing the benefits ultimately will be, in part because investment results will directly impact the amount of funds required to provide the promised benefits. Defined contribution plans have offered employers an alternative to DB plans, with a very predictable cost to the employer. However, this remedy compromises the benefits provided to retirees by eliminating a guaranteed level of income that is predictable prior to retirement.

Therefore, it seems the ideal remedy is an alternative retirement income system which preserves the defined benefit feature, but which is inherently less costly and problematic to fund. The proposed invention described herein, PENSION ALTERNATIVE RETIREMENT INCOME SYSTEM, (which will be referred to hereafter as "PARIS") is one which has such characteristics.

3. Objects and Advantages

PARIS described herein addresses the uncertain and sometimes prohibitive cost of providing defined benefits within a defined benefit pension plan by utilizing life insurance policies, split dollar life insurance, and collateralized loans in a new and creative way. PARIS will utilize these vehicles in such a way as to take advantage of the flexible nature of universal life insurance and split dollar arrangements, while pre-existing tax laws which will help to minimize the after tax cost of providing the promised benefits. It will do this by shifting the burden of providing benefits to multiple third parties who can each provide one component of the overall solution, and do it in such a way that the taxes applicable to the entire group of benefit providers is favorable. PARIS will also add value by effectively allowing the DB plan to lever up by borrowing at one rate via banks and reinvest at higher rates via insurance policies, something it would not ordinarily be able to do. Finally, by shifting the funding burden to other highly rated third parties, the plan sponsor can reduce the risk of failing to deliver the promised benefits to its plan participants.

SUMMARY

A method of funding benefits, promised as part of a defined benefit pension plan, by purchasing insurance policies, providing split dollar insurance coverage, and by indirectly acquiring low cost loans, all of which serve to lower the after tax cost of providing such benefits and reducing the dependence of plan participants on the future financial health of the plan sponsors.

DRAWINGS

FIG. 1 is a schematic illustrating the primary cash flows and relationships present in a traditional funding of a typical DB plan. A plan sponsor 102 makes contributions to a "qualified" (for favorable U.S. income tax treatment) DB plan trust 104. The trustees for the plan will make investments in the bond and stock market 106 on behalf of plan participants 108, who, once they reach retirement age as defined by the plan, will start to receive pension benefits under the plan. The pension benefits are taxable income to plan participants when received, taxes on which must be paid to the IRS 110.

FIG. 2 is a schematic illustrating a PARIS funding program for a qualified plan. As with a traditional funding of a qualified plan, a plan sponsor 102 makes contributions to DB plan trust 104, which will pay pension benefits to the plan participants 108, who will then have to pay taxes to the IRS 110 on such benefits. But with PARIS funding, the plan is using contributions to purchase insurance policies covering the plan participants from an insurer 202. The insurer will invest the insurance premiums it collects in the market 106 until it needs the funds to pay death benefits on the insured plan participants. The plan trust will also enter into an agreement with one or more benefit guarantors 204 to exchange death benefits on the plan participants for the pension benefits due the participants under the plan terms. The benefit guarantors, in turn, enter into an agreement with one or more lenders 206, each of whom agrees to lend the benefit guarantors the pension benefits they have committed to the plan, in exchange for a loan repayment upon the respective deaths of the plan participants, including repayment of any deferred and capitalized interest. Finally, the lenders, in order to finance the loans they make to benefit guarantors, would likely securitize their loans and sell them to investors 208.

FIG. 3 is a table illustrating the various cash flows and balance sheet items for a hypothetical DB plan in a PARIS program.

FIG. 4 is a table illustrating the various cash flows and balance sheet items for a hypothetical insurance policy in a PARIS program.

FIG. 5 is a table illustrating the death benefit splits between a hypothetical DB plan trust and benefit guarantor in a PARIS program.

FIG. 6 is a table illustrating the various cash flows and tax effects for a hypothetical benefit guarantor in a PARIS program.

FIGS. 7-10 contain summary output from a financial model which projects cash flows within a PARIS program based upon a specified collection of assumptions relevant to the DB plan, insurer, benefit guarantor, and lender.

Figure 2:
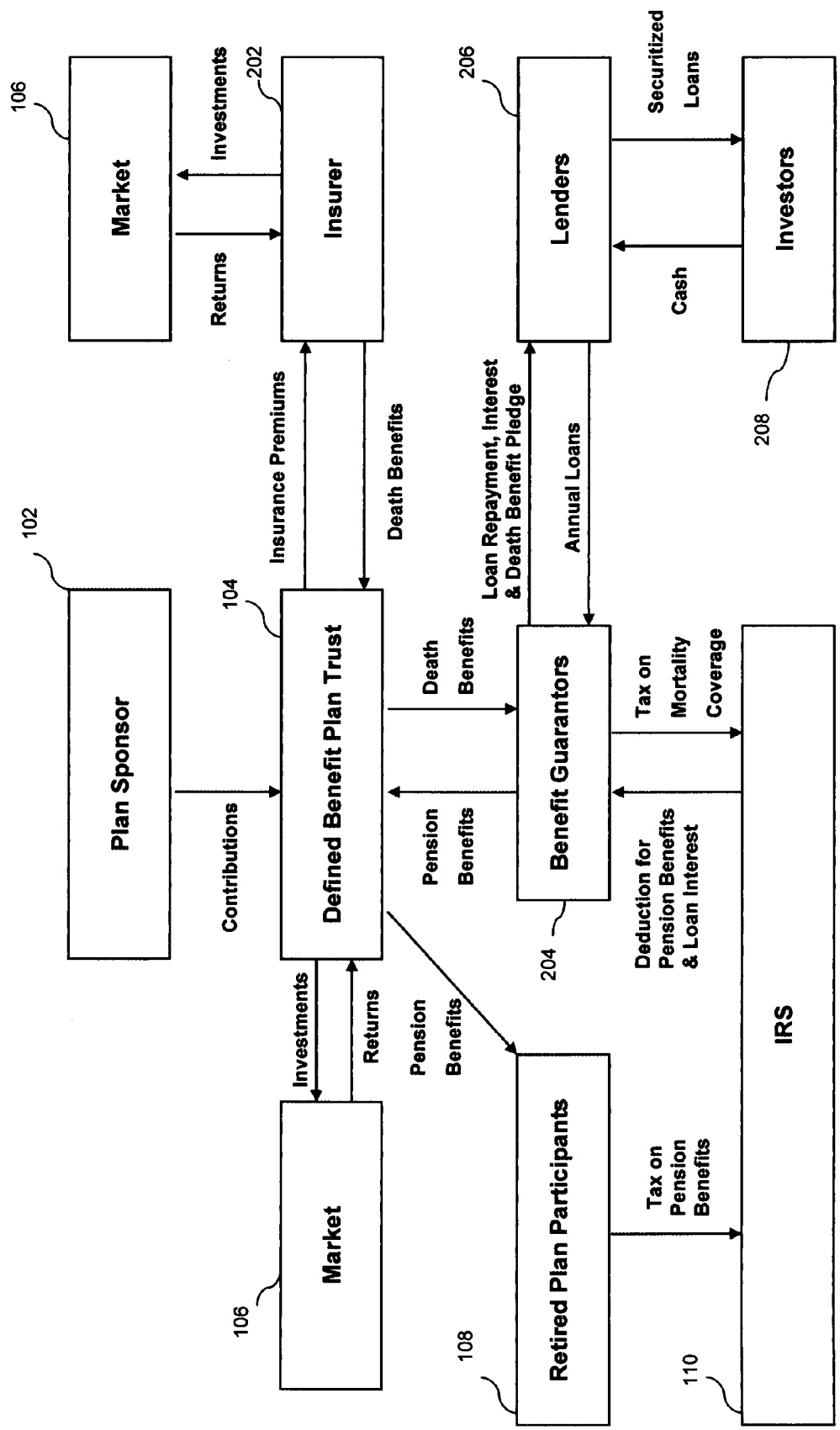
Figure 11:
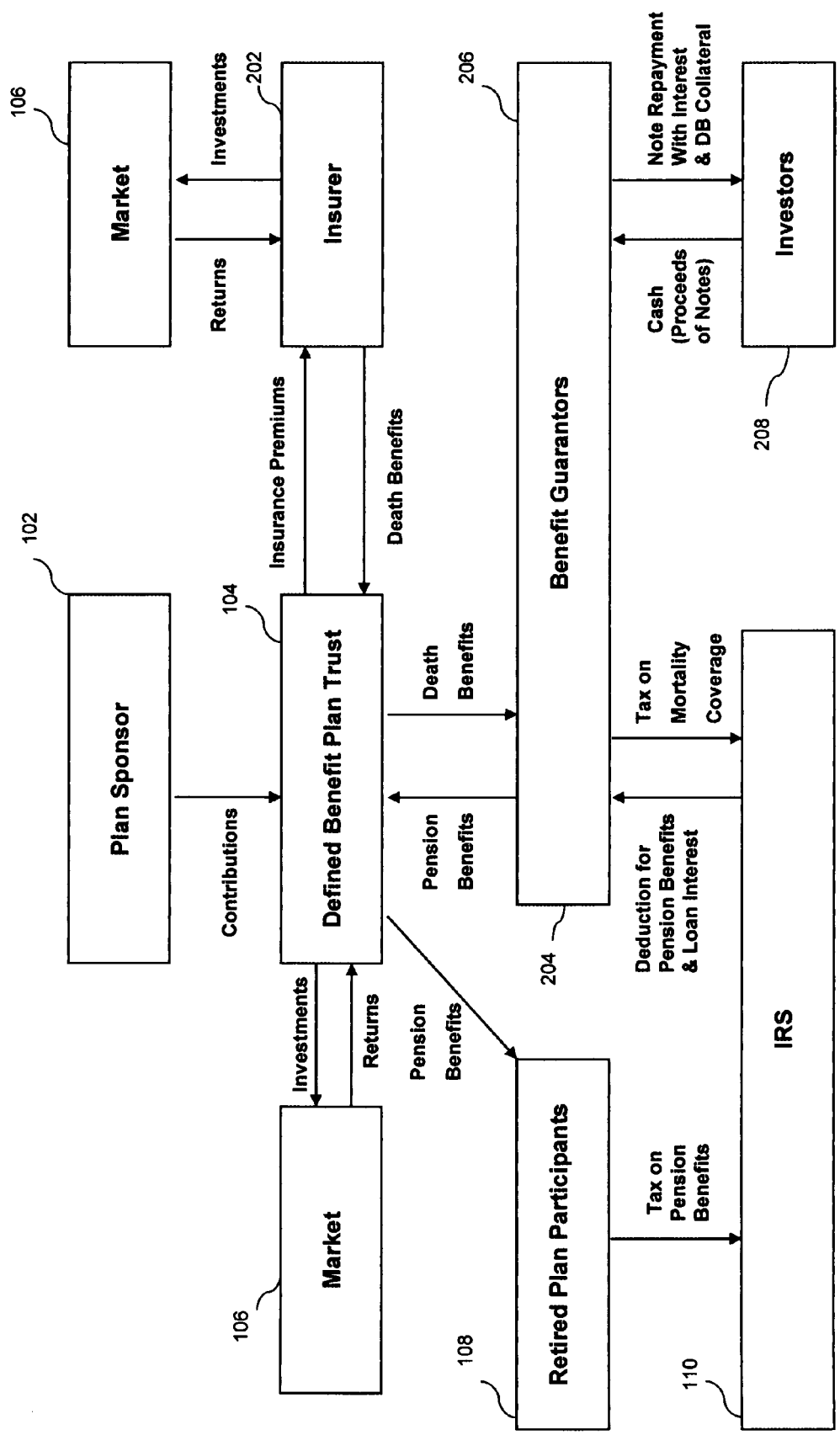

FIG. 11 is similar to FIG. 2 except that there is no lender to facilitate the benefit guarantor 204 with its provision of pension benefits to the DB plan trust 104. The benefit guarantor instead would issue notes secured by death benefit collateral to investors 208.

Figure 12:
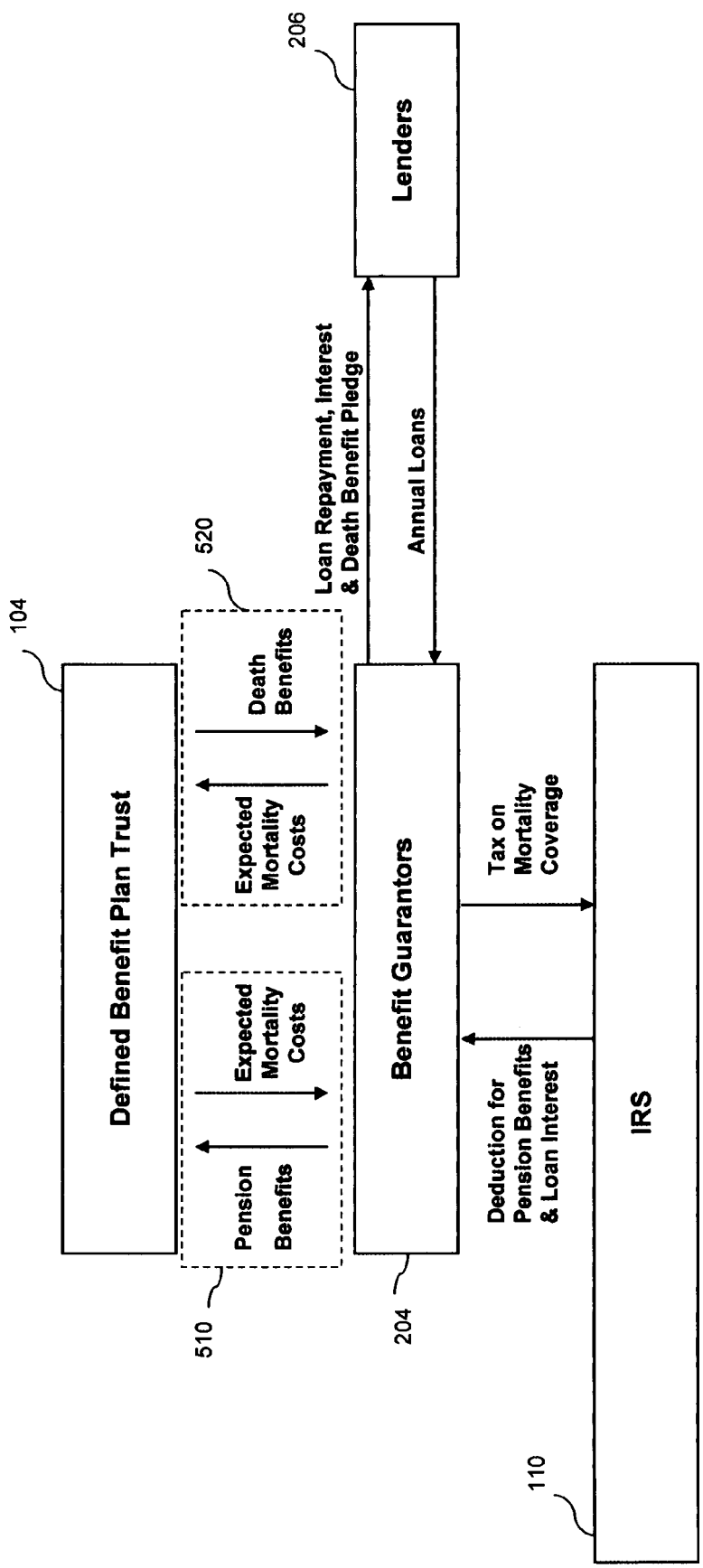

FIG. 12 is a schematic illustrating the portion of a PARIS plan that relates to the benefit guarantor 204. In this version, the benefit guarantor enters into two separate agreements with the DB plan trust 104. The first is an exchange of pension benefits for a series of expected mortality costs of death benefits equal to the cumulative benefits provided, as indicated by phantom 510. The second is an exchange of expected mortality costs on the cumulative benefits provided for actual death benefits, as indicated by phantom 520.

Figure 13:
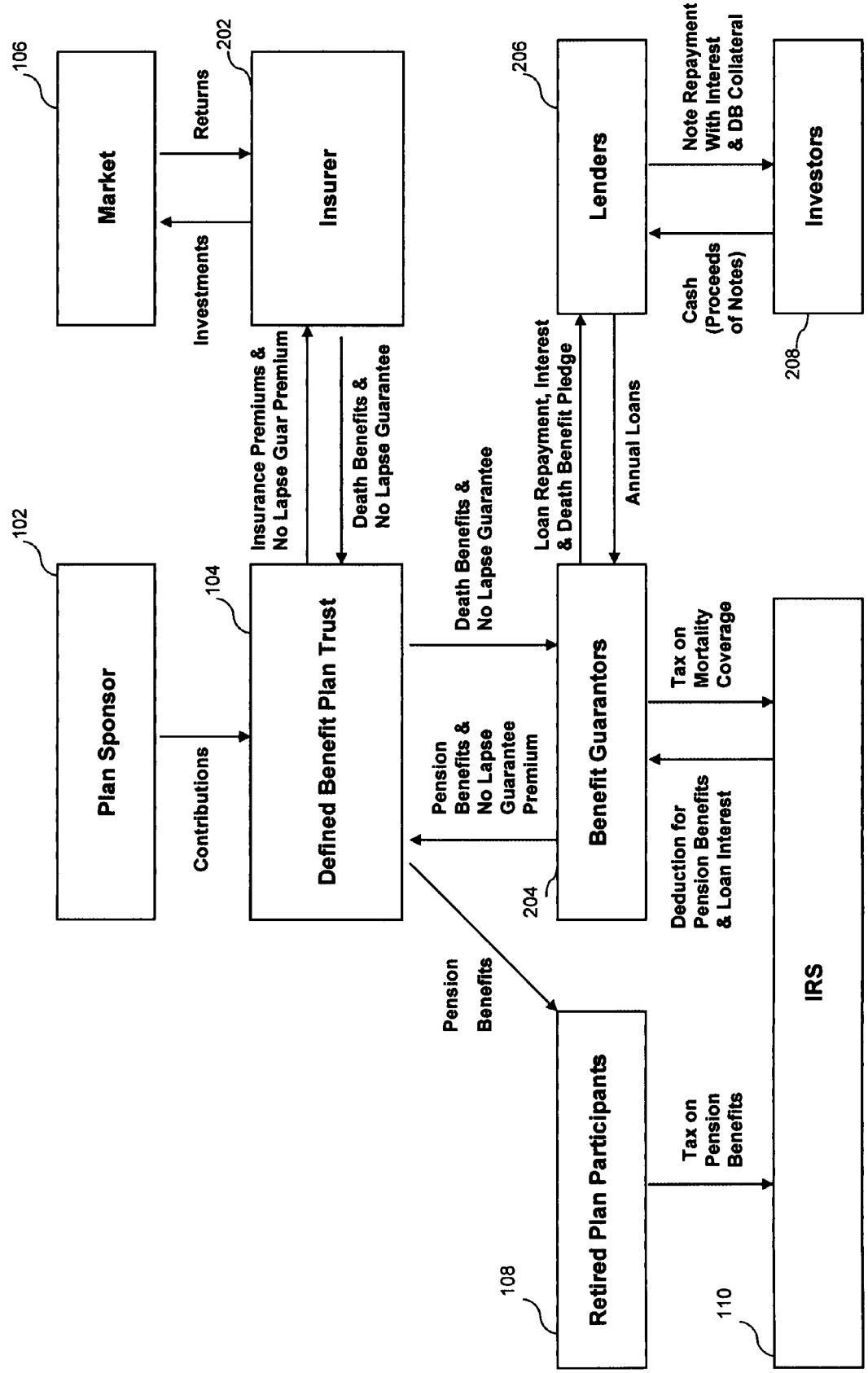

FIG. 13 is similar to FIG. 2, except that the insurer 202 is providing a no-lapse guarantee to the DB plan trust 104 for an extra premium. The plan trust passes on this extra cost and guarantee to the benefit guarantor 204.

Figure 14:
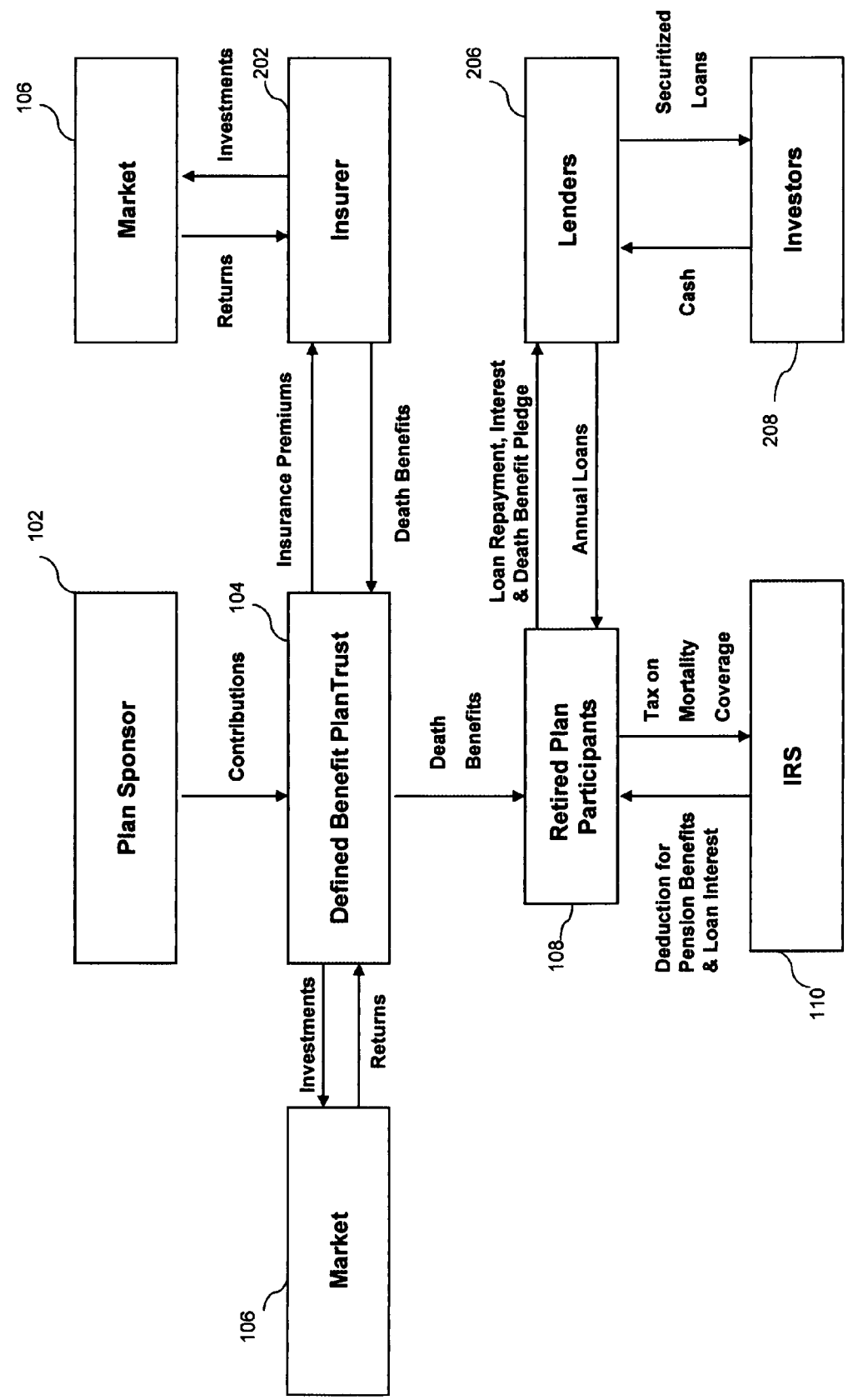

FIG. 14 is a schematic illustrating a PARIS variation in which no benefit guarantor is present. In this version the retired plan participants 108 receive death benefits from the DB plan 104, and then pledges those death benefits in exchange for a series of annual loans from a lender 206.

Figure 15:
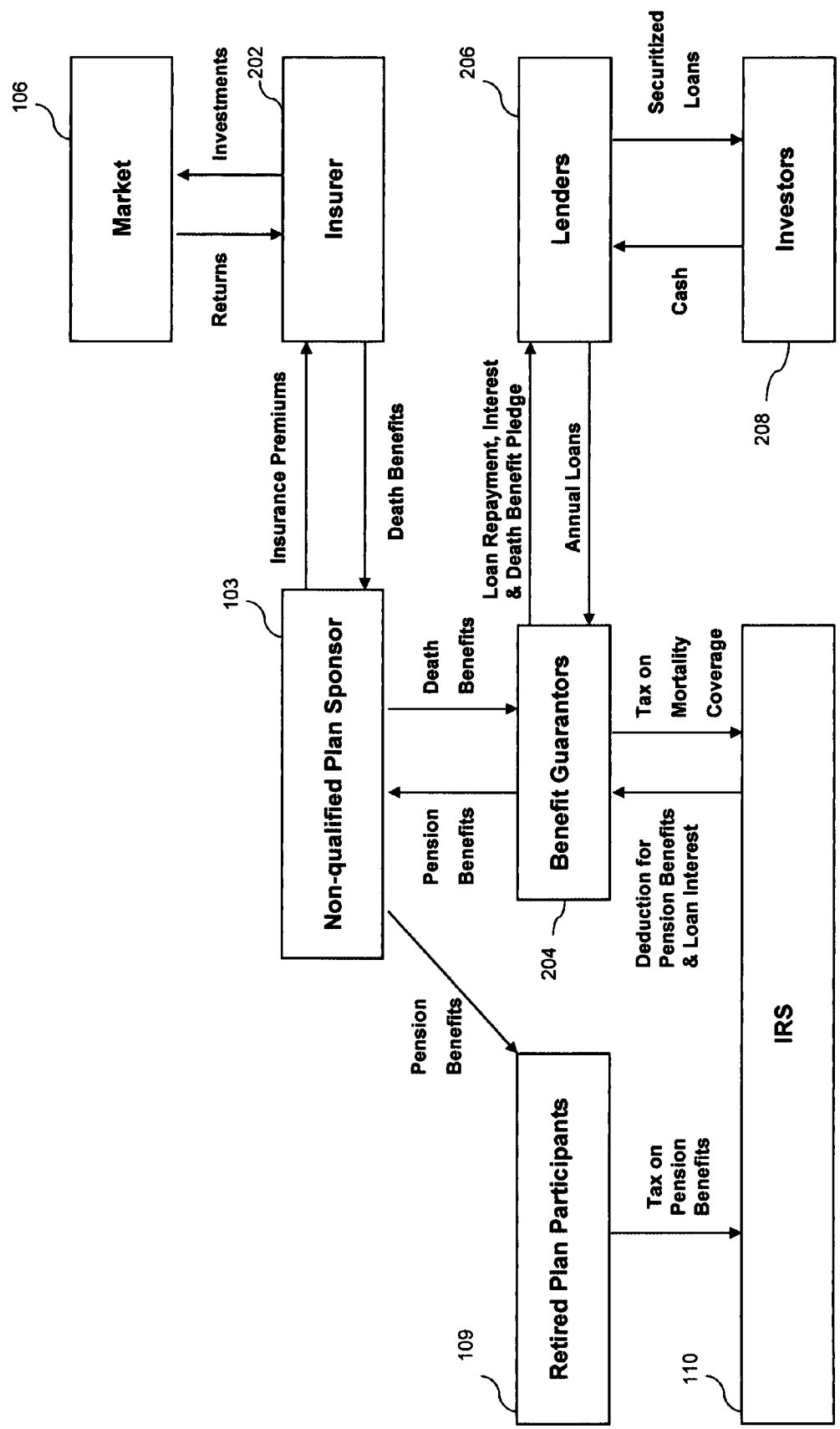

FIG. 15 is a schematic illustrating a non-qualified plan version of PARIS. In this version, there is no qualified plan trust in which the funding of benefits takes place. Instead, the non-qualified plan sponsor 103 directly buys policies from insurer 102, does a direct exchange of death benefits for pension benefits with a benefit guarantor 204, and makes direct payment of plan benefits to retired plan participants 109.

Figure 16:
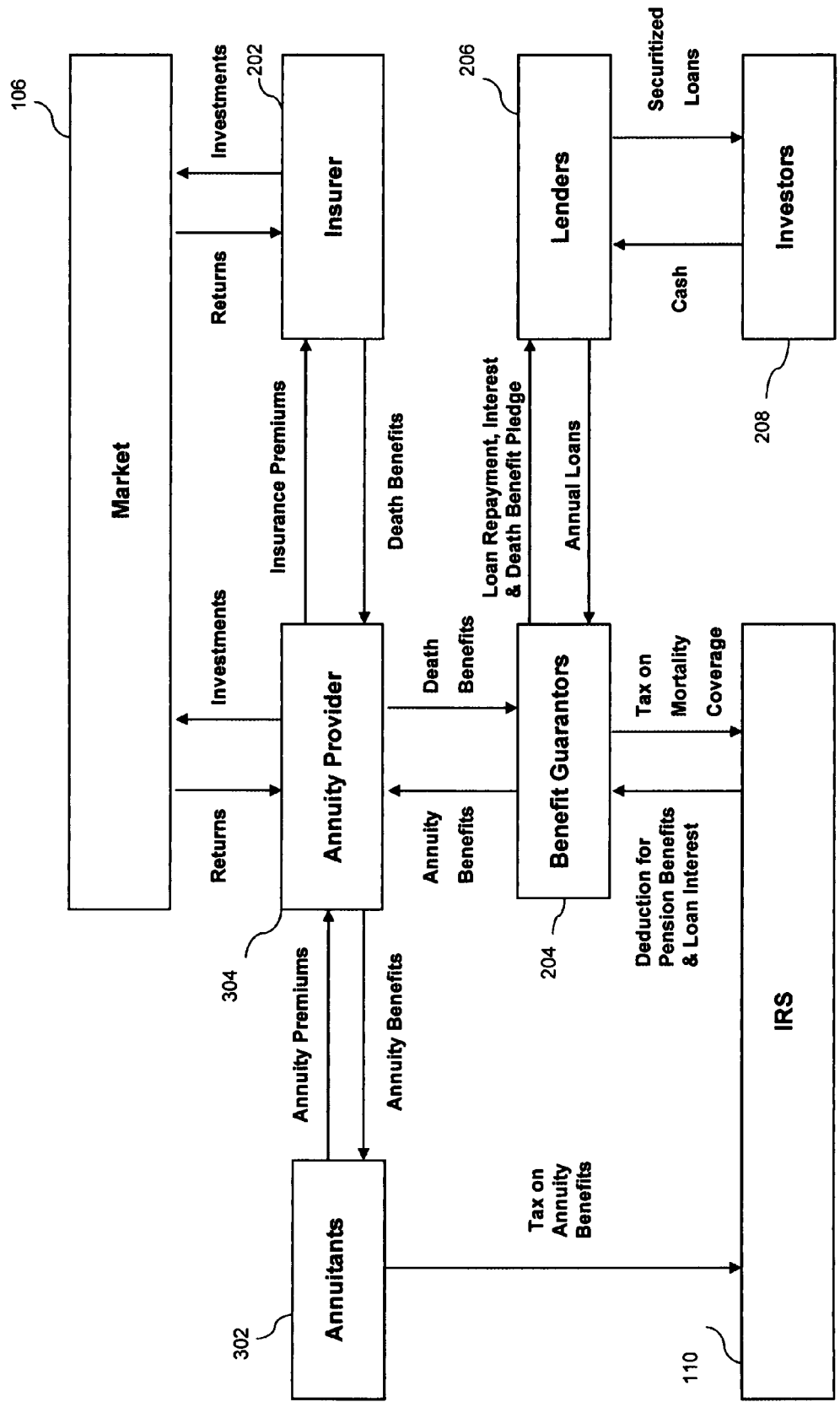

FIG. 16 is a schematic illustrating the more general PARIS case of an individual annuitant 302 who purchases an annuity from an annuity provider 304. In this case the beneficiary of the annuity benefits is also paying for them, unlike the case in which the defined benefit plan sponsor is making contributions to a trust to fund such benefit payments.

DETAILED DESCRIPTION

Preferred Embodiment

Figure 1:
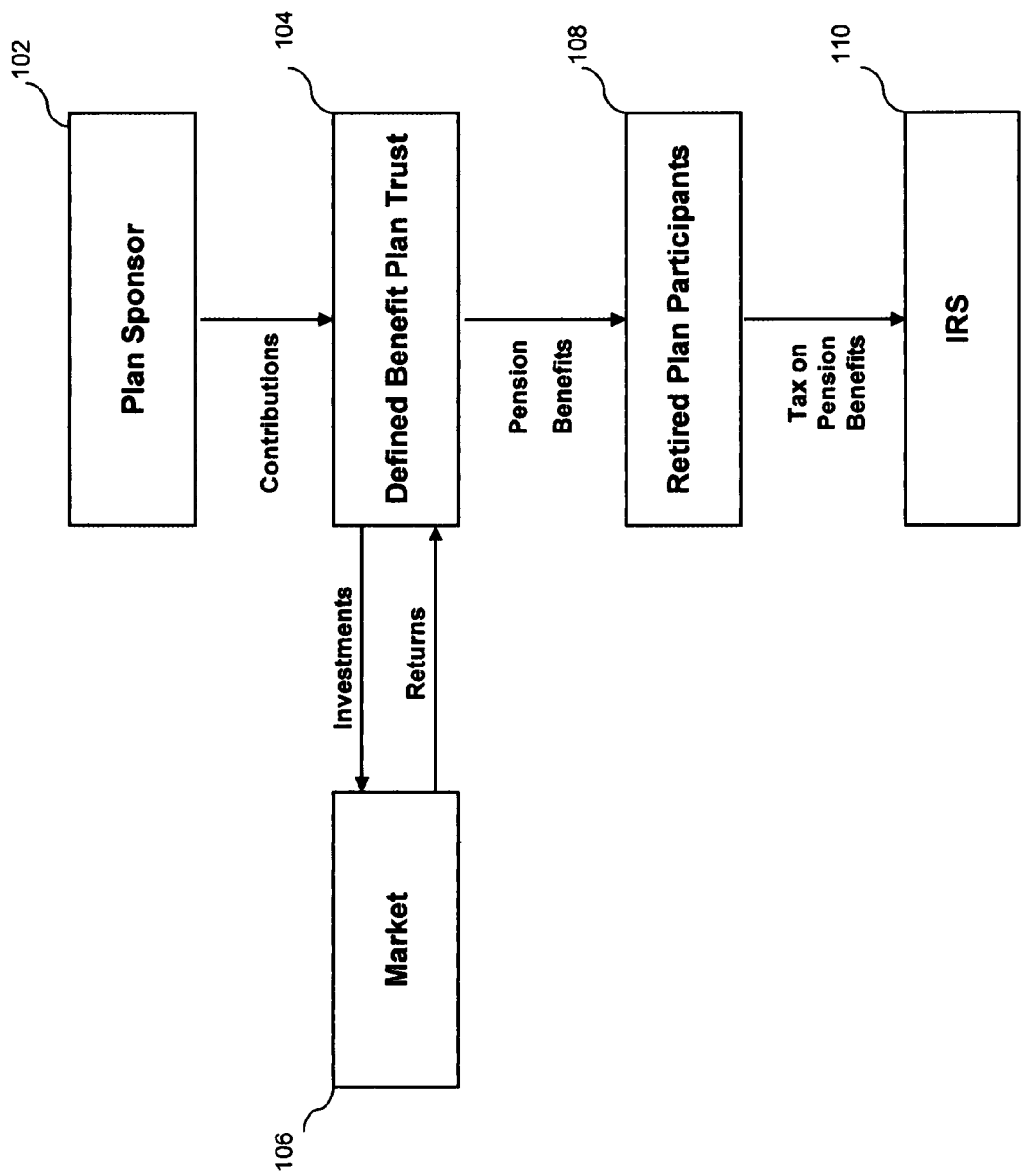

PARIS can help address the shortcomings of funding a traditional tax qualified defined benefit pension plan, which is illustrated in FIG. 1. In the traditional approach, the qualified plan trust 104 will take in contributions from a plan sponsor 102 and then invest these proceeds in the hope that total funds within the trust will be sufficient to pay out all the benefits promised according to the plan. The challenge for these plans is that the amount of contributions needed over a period of several years is highly dependent of what returns the plan can earn on its investments. Generally, during periods of lower interest rates, plans will be able to earn lower returns on their investments, resulting in more contributions being required to fund the promised benefits than if higher interest rates and higher investment returns are experienced. But having to make more contributions to DB plan trusts has placed a great deal of financial stress on many plan sponsors, who are therefore looking for remedies. One remedy is to terminate their plans and replace them with less costly plans and/or plans that may have more predictable costs. Another is to implement more effective investment strategies to reduce long term contribution requirements, but such strategies will come with their own risks. PARIS provides a different type of remedy to plan sponsors, one that effectively reduces the costs of providing the promised benefits, in addition to increasing the funds available to pay those benefits.

PARIS purports to achieve this effective lowering of the cost of providing benefits by employing additional investment vehicles, namely insurance policies and structured loans. FIG. 2 illustrates how these investment vehicles fit into a PARIS program and how PARIS compares and contrasts with the traditional funding of a typical plan. With PARIS, the plan will shift its basic investment approach by purchasing insurance policies, indicated in phantom 150, on the participants in the plan. It does this because the death benefits that the plan will receive will help to indirectly pay for the required pension benefits, while still allowing the plan to make similar investments via the insurance policies. The insurance policies can achieve this because they consist of both an investment component and a mortality component.

For the investment component, the insurance company 202 issuing the policy can make most or all of the same investments on behalf of the plan that the plan trust would otherwise have made in absence of the PARIS plan. The insurance policy, in turn, conveys those investment returns to the plan trust, as owners of the policies, via the insurance policies' prescribed benefits, whether they be benefits payable at death or earlier surrender of the policy. At the death of the insured participants, the insurance policy would pay a death benefit that would equal the sum of the investment component and the mortality component. The mortality component is sometimes referred to as the "net amount at risk", and the insurance company assesses a risk charge on the insurance premiums it collects in order to be able to pay out the net amount at risk at the eventual death of the insured.

The purchase of insurance policies are not in and of themselves a remedy for qualified plan sponsors. Rather, it is what the plan does with the insurance policy that adds real value. In a PARIS plan, the plan trust will share a portion of the death benefits from the insurance policies with one or more benefit guarantors 204 in exchange for their commitment to provide the prescribed pension benefits due the retired plan participants 108. This can be done through an absolute assignment of some portion of the death benefit from the plan to the benefit guarantor. The amount of death benefit to be assigned would be a negotiated item between the two parties, but it might approximate the cumulative amount of pension benefits provided to date by the guarantor with respect to the insured plan participant, accumulated with some amount of interest.

In a PARIS plan, the benefit guarantor would be committing to making a series of payments to the DB plan, in exchange for a death benefit payment that occurs after that last of the series of pension payments has been made to the plan. This will cause at least a temporary cash flow strain on the benefit guarantor. To alleviate this strain, the benefit guarantor could enter into an arrangement with a lender 206 who will agree to provide a series of loans to the guarantor sufficient to allow the guarantor to meet its pension benefit commitments. This loan would likely be due at the death of the respective plan participant, since that is when the guarantor would cease needing any further loan proceeds and would also have death benefit proceeds available to repay the loan. The loan interest rate would be a negotiated item between the lender and the benefit guarantor, but should reflect the perceived riskiness of the loan.

To reduce the interest cost of these loans, the benefit guarantor would likely pledge the death benefits assigned to it to the lender as collateral for its loan. Considering that the death benefits may be coming from highly rated insurers, and that death benefits are given the highest priority by state regulators should the insurers become insolvent and be taken over by the state, such collateral should be deemed very valuable by lenders, thereby helping to minimize the interest costs of the loans to the benefit guarantors.

Finally, because lenders will incur cash flow strain in making their series of loan payments to guarantors, they may choose to securitize these loans and sell them in the form of securities to capital markets investors. This would not only allow the lenders cash flow relief, but it would allow them to monetize the present value of profits generated at the time they originate the loans. For example, if lenders could make loans to guarantors at a floating interest rate of LIBOR+90 basis points, and sell the loans to investors at a rate of LIBOR+40 basis points, the lender could realize a profit of the present value of the 50 basis point per annum differential, which might equal roughly 300 to 400 basis points (i.e., 3% to 4%) on the total loan proceeds.

What has been accomplished in such an arrangement? The DB plan trust will now be the recipient of the pension benefits it needs to pass on to its plan participants, but more importantly, it may be able to achieve this at either a lower cost than the traditionally funded pension plan or a more certain cost at the outset, or perhaps both of these things. Why or how would that be the case?

There are 3 reasons that a PARIS plan can add value relative to a traditional DB plan. These are tax deferral, a reduction in taxes, and financial leverage. Let's look at each of these separately.

1) Tax Deferral: the qualified DB plan trust is a tax exempt entity, so PARIS is not going to help the DB plan's tax status. However, the other role players will generally be tax paying entities, and PARIS could impact their tax picture. Specifically, the benefit guarantors could derive a significant tax deferral for the following reasons: First, the pension payments it makes should ordinarily be tax deductible at the time they are made (an assumption is being made here that the guarantor has taxable income which could be offset by current deductions). Second, the guarantor will start accruing loan interest that it owes the lender for the loans it receives to make the pension payments. The accretion of this loan interest should also be currently deductible assuming the guarantor is taxed on an accrual basis. Ultimately, the guarantor will receive death benefits from the DB trust that will allow the guarantor to repay the loans plus the accrued interest. Those death benefits may allow the guarantor to be cash flow neutral before taxes, but how are the death benefits themselves taxed?

The death benefits will be taxed based on their expected timing and amount, rather than their actual timing and amount. In actuality, the death benefit gets paid all at once, shortly after the death of the insured, but current US income tax laws provide that the expected value of death benefits that are potentially payable as part of a split dollar life insurance agreement should be taxed each year. Therefore, instead of having one large taxable income occurrence in the actual year of death, you have a smaller probability weighted taxable income due each year that the beneficiary has the potential of receiving a death benefit. This probability weighted taxable income, referred to as the economic benefit in the tax code, is calculated by multiplying the potential death benefit by an applicable mortality rate for the insured life (in this case, the plan participant). The applicable mortality rates are specified by the IRS.

Having previously stated that pension benefits would be deducted when paid, and loan interest would be deducted as it accrued, and now having determined that death benefits, which would be used to repay loans used for pension payments and for accrued interest thereon, are taxed over a series of years based upon probabilities of death in those years (i.e., mortality rates), a tax deferral has been created for the guarantor. This is most easily recognized by seeing that the taxable income related to the death benefits always occurs later than the corresponding deductions regardless of the year of actual death. It is also important to note that the tax deferral described here is not an absolute tax savings, but rather a timing benefit that should save the guarantor money on a present value basis. If the mortality rates used to calculate taxable income for the guarantor's death benefit coverage equal actual mortality experience overall (for a pool of lives and over a period of time), then the guarantor would eventually have taxable income equal to its total deductions, albeit the taxable income would come later than the deductions. Furthermore, the lender who makes the loans to the guarantor, will most likely be generating taxable income itself each year (i.e., the accrued loan interest), so the IRS will have net positive taxable income in the aggregate. The insurer's profit margins will also generally create additional taxable income along the way.

2) Reduction in Taxes: this savings again relates to the benefit guarantor. The applicable mortality rates used in the taxable income calculation are specified by the tax code, but it also specifies permissible circumstances for using alternative mortality rates which may be more favorable. In fact the use of such alternative mortality rates has been permitted by the IRS for more than two decades. Many corporations have taken advantage of these rules over the years via split dollar life insurance arrangements they create for their employees. The use of such alternative rates, in those cases, served to reduce the taxable income for employees of corporations who provided death benefit coverage to them. In fact, many insurers developed term insurance products expressly for this purpose, so that corporations could reduce the taxable income for employees for whom they provided insurance.

Via the same use of alternative mortality rates, the benefit guarantor has the potential of utilizing mortality rates for the taxable income calculation which are more favorable than the standard rates that the IRS authorizes. This would result in an outright tax savings irrespective of time value considerations outlined in 1) above. The tax savings would occur because the use of alternative mortality rates for tax purposes would likely equate to using more favorable mortality assumptions than will actually be experienced for the pool of lives as a whole. The underlying reason for this is that the alternative term rates permitted are generally constructed assuming that insureds are medically underwritten each year, when if fact the pool of lives in a PARIS program (or any other split dollar arrangement) will not be. Hence, a healthier pool of lives is presumed to exist for the alternative rates than will likely be the case.

3) Financial leverage: this occurs by virtue of the PARIS agreements which infuse more money into the plan trust during the life of the plan participant. In a traditional plan, trust assets would normally start paying for benefits when the participant hits retirement age. But in a PARIS program, the trust instead puts money into a life insurance policy while the benefit guarantor pays benefits. The life insurance policy is a plan trust asset, so the plan assets continue to grow during this period when ordinarily they would start to diminish as benefit payments are made. In a PARIS program, the plan assets will remain larger until the death of the plan participants, at which time a portion of the death benefit will be paid to the guarantor (to compensate it for all the benefit payments it provided for along the way).

This extra buildup of assets in the plan trust could add value to the plan if the extra interest it earns inside the insurance policy is more than it pays out in the death benefit, which will also include an implicit interest component. For example, if the insurance company earns and credits 6.5% interest, while the death benefit paid to the guarantor is only increasing at 6% interest, then the plan would be earning and retaining the difference on the loan balance.

This is very possible because highly rated insurance companies typically invest in corporate bonds that are rated A by S&P, while the lender, who is providing the funds to the guarantor to pay the plan benefits which frees up funds to invest in insurance policies, may be able to lend at AA or AAA rates (which would be lower than A rates). This may be possible because the death benefits which are pledged as collateral for the loan may be considered very reliable collateral as death benefits from insurance companies have always been paid even by bankrupt insurers. This is attributable to the fact that state regulators will make death benefits the highest priority if they take over a company, even if they have to restrict other benefits. Having valuable collateral can induce a lender to offer an attractive loan rate, and that fact could lead to a positive spread opportunity for the DB plan trust.

Finally, an important fact of a PARIS program is that each party to the transaction (other than the individual plan participants) can retain a great deal of flexibility and ability to terminate the transaction with respect to future pension benefits. For example, if after the third year the plan sponsor decided they needed or wanted to terminate the DB plan anyway, or convert it to a defined contribution plan, they could potentially exercise an option to do so. What would be the ramifications of this? First the lender would stop making future loans, but would continue to accrue loan interest on loans made to date. The guarantor would stop making future pension payments, but would continue to receive death benefits sufficient to cover benefits paid to date with interest. This would allow the guarantor to continue to receive tax advantaged treatment on the lower death benefits that will remain in place, as well as continue interest deductions on the existing loan that will remain outstanding. The insurance company would modify its policy so that the death benefits wouldn't increase for future benefits, but instead only with interest for benefits already paid to date, so it would also continue to earn margins on a scaled down basis. The plan itself would already have benefited from 3 years of benefit payment savings. One possible exit provision is that the plan would pay an additional premium to the insurer to secure a paid up policy for the reduced face amount required for future years. Extensive modeling of hypothetical programs suggest that the plan could easily afford to do this and only use a portion of its savings to date to secure such a paid up policy. In a similar vein, both the lender and the benefit guarantor might also have options to exit the program with respect to future benefits, perhaps with some penalty which would be negotiated at the outset with the plan sponsor. Only the insurer could not have an option to exit prematurely as that would allow them to select against unhealthy lives before death occurred, undoing the value of the insurance protection. However, insurers are in the business of providing that protection and would not expect such an exit provision.

Operation—FIGS. 6-10

FIGS. 3-10 illustrate many of the potential financial impacts resulting from the implementation of a PARIS plan. These are all output sheets from a financial model created to model cash flows for both a traditional defined benefit plan and a PARIS program under a variety of assumptions so that the potential impact to each party in a PARIS plan can be estimated. There are many variables relating to each of the parties that could have a bearing on the financial impact to all the parties, and many of those more important variables are illustrated in FIGS. 7-10.

Figure 7:
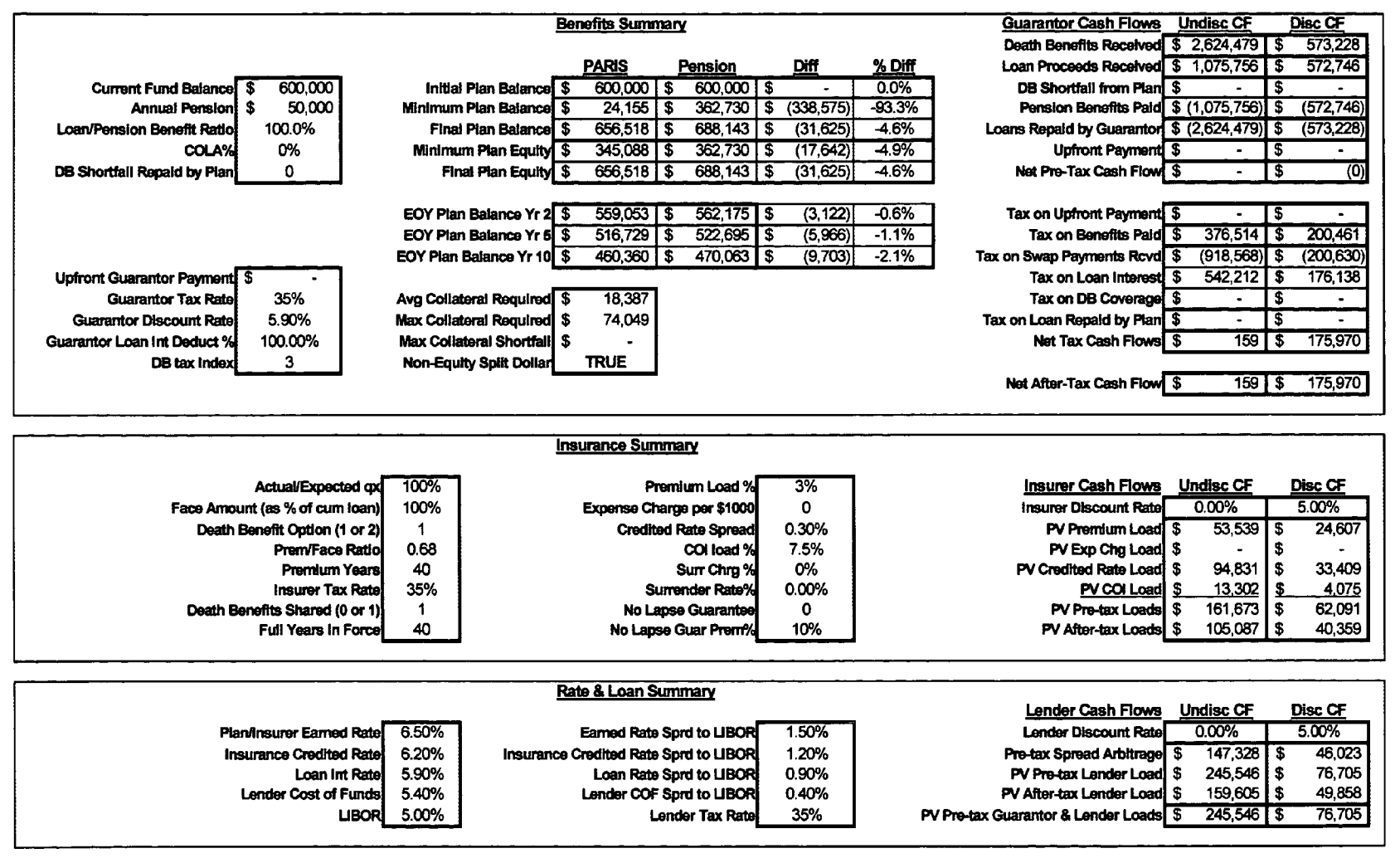

FIG. 7 illustrates some of the fundamental aspects of a basic PARIS program. In this example, the guarantor's total pre-tax cash flows would be zero each year because the loan/pension benefit ratio and death benefit face amount (to loan) ratio are both specified as 100%. Therefore, the guarantor would receive a loan each year sufficient to fund its annual pension benefit obligation, and then receive a death benefit sufficient to repay the cumulative loan plus interest upon the death of the retired plan participant. This is illustrated in the right hand section of the benefits summary in FIG. 7.

FIG. 7 also illustrates an important facet of the expected tax benefits under a PARIS program. In this example the mortality rates assumed for purposes of the economic benefit calculation for the guarantor's death benefit is set equal to the expected mortality rates for the pool of retired plan participants (as indicated by DB tax index of 3). As discussed in the earlier detailed description of a PARIS program, the guarantor would eventually have as much taxable income as it had deductions if the mortality rates for tax purposes equaled the mortality actually experienced for the pool of retired lives. This can be seen in the section illustrating the guarantor's tax related cash flows where the deductions for death benefits saved $376,514 in taxes and deductions for loan interest saved $542,212 in taxes, while the taxes on death benefit coverage totaled $918,568 (shown in FIG. 7. as the tax on swap payment received). The savings from deductions almost exactly offset the taxable income, with a net positive cash flow of only $159. In fact, this figure would have been zero except for minor timing differences between the payment of loans, pension benefits and death benefits.

The economic value of the tax deferral can be seen on the far right side of FIG. 7 as $175,970. This present value figure is based upon the guarantor discount factor of 5.90% illustrated on the left hand side of FIG. 7. Furthermore, it is interesting to note that present value of pension benefits paid is almost identical to the present value of death benefits received, resulting in the net present value of the tax deferral being equal to the present value of the loan interest deductions ($176,138). This is not surprising given that the death benefits in this PARIS example are defined to be equal to the cumulative pension benefits paid, along with accumulated interest at the loan interest rate (5.90%), when you consider that the present values are being calculated using that same discount rate of 5.90%. In other words, the death benefits, even though larger than the pension benefits paid, will have about the same present value as the pension benefits paid when discounted at a rate close to or equal to the loan interest rate. Therefore, in these cases the net present value of the tax deferral will be approximately equal to the present value of the tax savings from the loan interest deductions.

FIG. 7 also illustrates what the insurer and lender might earn for playing their respective roles in a PARIS program. The insurer will typically earn this by building various margins into the insurance policies it sells. For example, the possible sources of profit might include:

A sales load as a % of premium paid

A mortality load as a % of cost of insurance charges

An interest charge as a deduction to the interest rate credited

An expense charge as a dollar amount per $1000 of face amount

A surrender charge as a % of account value in event of policy surrender

The example in FIG. 7 assumes insurer margins of 3% of premium paid, 7.5% of expected mortality rates (in the cost of insurance charges), and 0.30% of the account value as an interest rate margin (i.e., the difference between the rate of return the insurer earns on its investments and the interest rate it credits to the account value of the policy). These margins, after applicable taxes for the insurer, add up to $105,087, with a present value of $40,359, as seen on the right side of the insurance summary section of FIG. 7.

The lender is assumed to earn margins only as an interest rate spread between the loan rate it charges the benefit guarantor and the rate the lender itself must pay to borrow money (Lender Cost of Funds). In this example, that interest rate spread is 0.50%, calculated as 5.90% less 5.40%. This generates total after tax profits of $159,605 for the lender, with a present value of $49,858.

Figure 8:
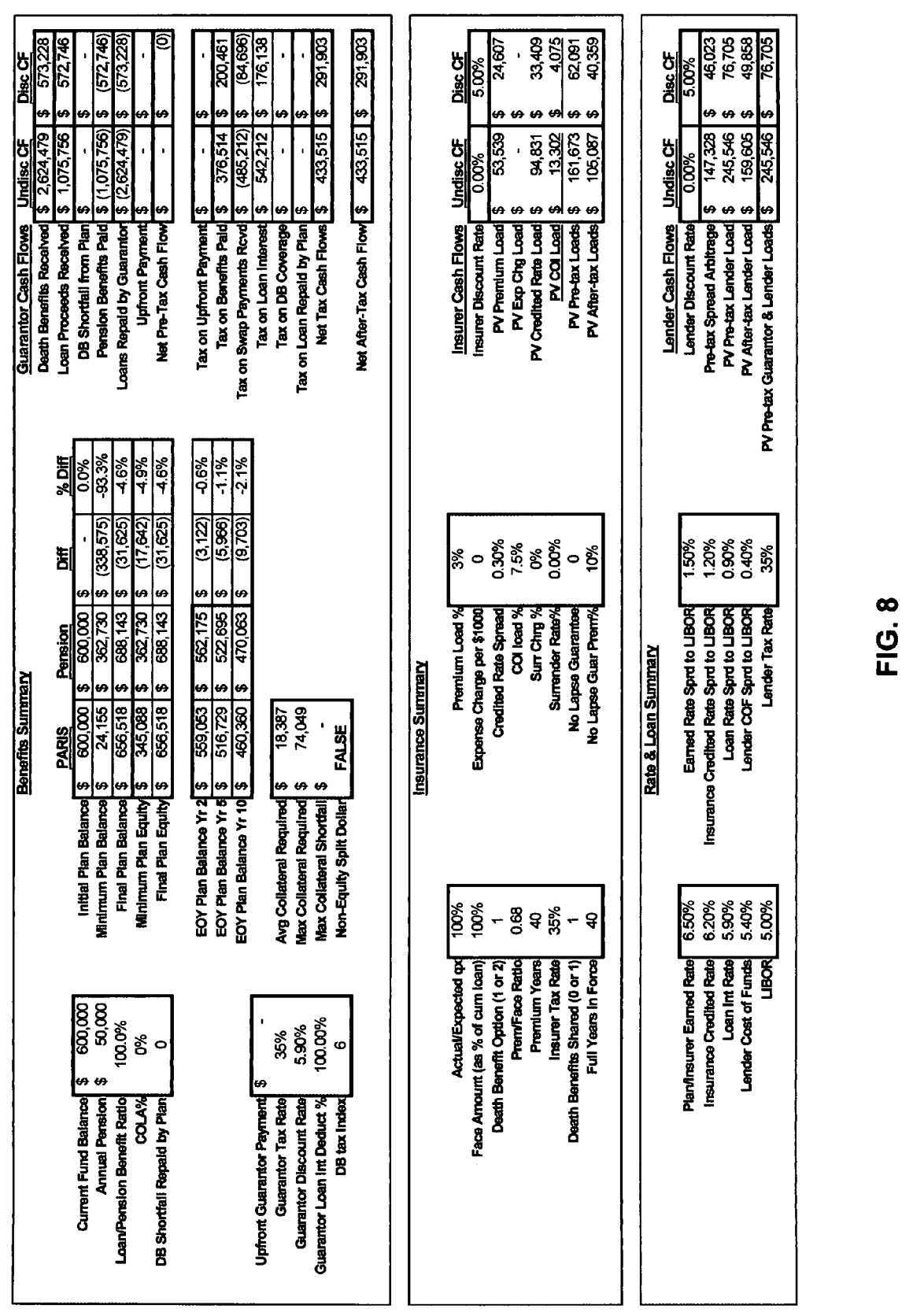

FIG. 8 illustrates a slight variation of the example from FIG. 7. The only difference between the two is that the example in FIG. 8 assumes more favorable mortality rates for purposes of the economic benefit calculation related to the mortality coverage the guarantor receives from the DB plan trust (as indicated by a DB Tax Index of 6). As explained earlier in the detailed description of PARIS, the use of alternative mortality rates for the calculation of taxable income for the recipient of the insurance coverage may result in tax savings in addition to the tax deferral benefit just described. This can be seen as the net tax cash flows increase from only $159 (in FIG. 7) to a total savings of $433,515 in FIG. 8. The present value of the additional tax savings due to the favorable mortality rates equaled $115,933, as the present value of tax related cash flows increased from $175,970 to $291,933. Therefore, the tax savings due to more favorable tax rates equals roughly 40% of the total tax related savings on a present value basis.

Figure 9:
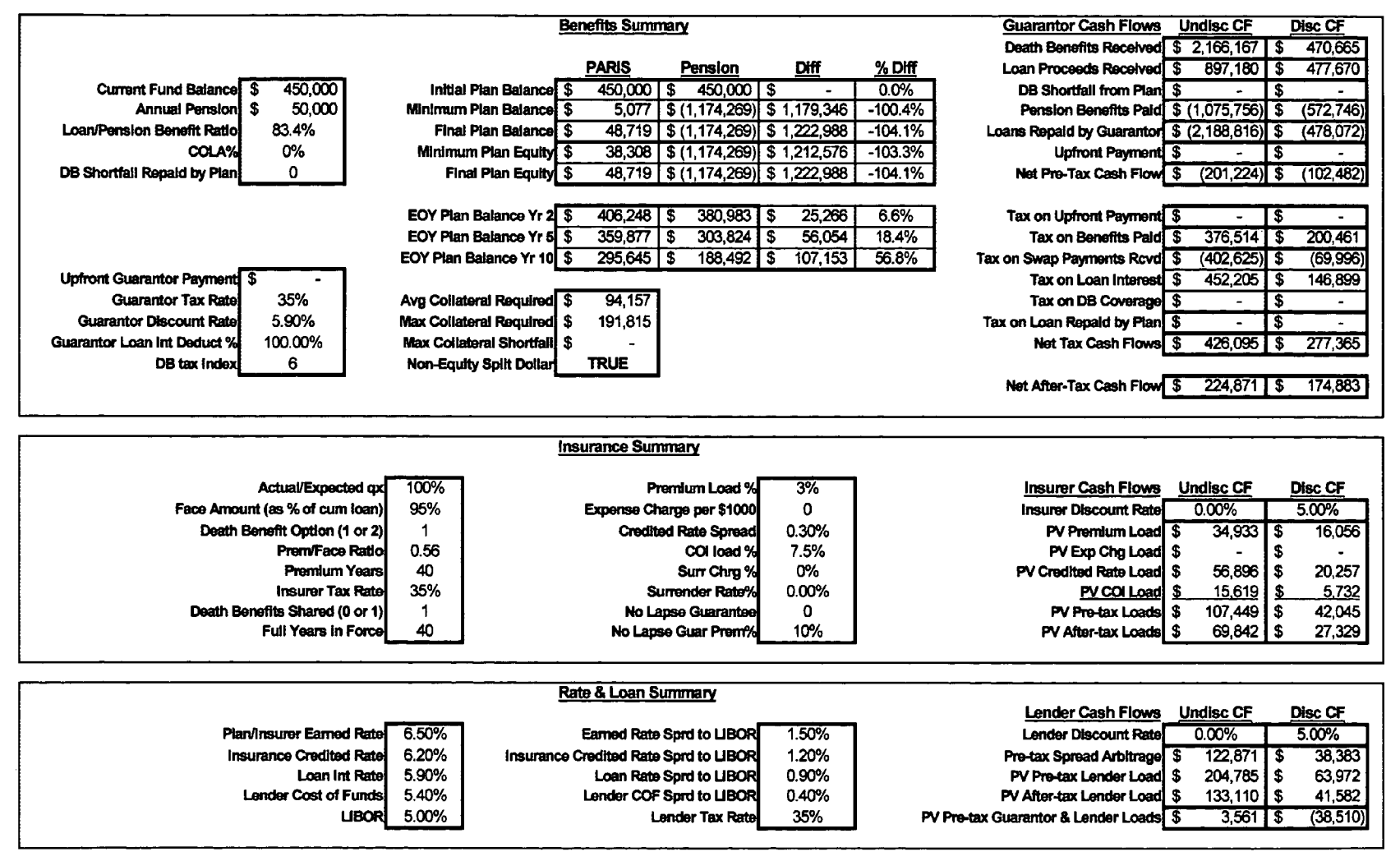

It should also be noted that in both examples in FIGS. 7 and 8 the DB plan was relatively indifferent economically between the PARIS program and the traditional funding of a DB plan. This can be seen in the upper middle portion of each of FIGS. 7 and 8. Those examples were constructed with that intention. By contrast, FIG. 9 illustrates a hypothetical PARIS plan in which the DB plan benefits directly from the PARIS program. This was accomplished with 3 primary changes in the program relative to the previous examples. First, the initial plan contributions were lowered from $600,000 to $450,000, a 25% reduction. Second, the Loan/Pension Benefit Ratio was reduced from 100% to 83.4%. Third, the Face Amount to Loan ratio was also reduced from 100% to 95%. Let's examine what these three changes accomplished.

The reduction in contributions is a huge benefit to the DB plan if it can still provide the promised benefits to plan participants. However, FIG. 9 shows that the traditional plan would fail by a significant amount with this level of contributions (with a final plan equity of negative $1,174,269), but with the PARIS program the DB plan equity is able to remain positive in all years (with a minimum value of $38,308). This is attributable to the second and third changes above. The reduction in the two ratios above means that the plan is still receiving the full $50,000 annual pension benefit from the benefit guarantor each year, but in return is only providing death benefits to the guarantor equal to 79.23% of the cumulative benefits provided plus interest (83.4%*95%). In the previous examples, the plan was providing the guarantor with death benefits of 100% of such cumulative benefits paid plus interest. This savings to the plan's expenditures is what allows it to successfully reduce it plan contributions by 25%. Of course, the benefit guarantor bears the major brunt of this, as its pre-tax cash flow changes from 0 to negative $221,224, while its overall expected profit, on a present value basis, declined from $291,933 in FIG. 8 to $174,883 in FIG. 9. Both the lender and insurer would also expect somewhat lower total profits because of the reduced amount of loans and insurance coverage utilized in this particular example. This example contained in FIG. 9 is probably more realistic than those in FIGS. 7 and 8 as the PARIS program should benefit the DB plan and not just the other parties involved, and in this case the DB plan is benefiting significantly.

FIG. 10 shows summary model output specifically to demonstrate the magnitude of the DB plan benefit received in the FIG. 9 example. Specifically, in FIG. 10 the assumed investment earnings rate on DB plan assets is 3.00% higher than in the previous examples (as evidenced by the Plan/Insurer Earned Rate increasing from 6.50% to 9.50%). What FIG. 10 illustrates is that the traditional DB plan could also reduce its contributions by 25% down to $450,000 if the plan could earn an additional 3.00% on its investments, as evidenced by the DB plan equity remaining positive and at about the same levels as it did at the higher contribution level with the original investment assumptions. This suggests, at least under some conditions, that a PARIS funding approach could be adding roughly 300 basis points of value to the DB plan, which is a significant incremental return on any investment.

Additional Embodiments

There are several other embodiments of a PARIS program that could also be valuable, or perhaps even more valuable under a given set of circumstances. These include:

1. The benefit guarantor and the lender are the same entity, as illustrated in FIG. 11. Such an arrangement would offer the benefit guarantor considerably greater profit potential, but with greater burdens as well. In this expanded role, the guarantor may experience a considerable cash flow drain between the time benefits are paid and the time a securitization can be done. Also, since there are technically no loans in this variation, but notes issued to investors, the interest deductions for guarantors would begin when notes are issued, which will be somewhat later than interest on loans would otherwise begin to accrue. Still, the disadvantages could be worth it to a particular guarantor because of the extra profit potential. Not only are the incremental profits attractive (see FIGS. 7-9 to gauge this), but the combined role may allow the guarantor to show positive profits on a pre-tax basis, which it might deem important to its tax analysis (i.e., the expected tax benefits may be deemed by the guarantor to be less risky if there are pre-tax profits as well). For example, in FIG. 9, the guarantor expects a pre-tax loss of $201,224, while the lender has an expected pre-tax profit of $204,785, so the guarantor that plays both roles might expect slightly positive pre-tax cash flows.

2. FIG. 12 illustrates an alternative arrangement between the DB plan trust and the benefit guarantor. The intent of this arrangement is to duplicate or closely replicate the economics of the simpler version of PARIS illustrated in FIG. 2, while lessening the tax risk to the guarantor. The risk of the simpler version is that the IRS might argue that the exchange of pension benefit payments for later death benefits on the same respective lives are simply long term loans and should be taxed as such. This might eliminate the tax deductions for the benefit payments along the way. The alternative arrangement in FIG. 12 breaks the arrangement between DB plan trust and guarantor into two contracts, the first being a swap of benefit payments for expected mortality costs (of death benefits to be received), with the second being a purchase of actual insurance coverage for the a stream of insurance premiums (i.e., the expected mortality costs). Even though these economically amount to the same cash flows as the simpler arrangement, having two separate contracts could bolster the guarantor's tax position (i.e., that the contracts should be treated as a swap and a split dollar insurance arrangement). There are some additional steps that could be taken to further bolster the argument that the agreement between the DB plan trust and the guarantor is not a loan. These include:

a. Make the purchase of insurance an option for the guarantor, perhaps exercisable only within a specified time period.

b. The option exercise period could begin at some point in the future to further validate that these really would be two separate contracts.

c. Make the receive leg of the swap based on expected survivorship rather than actual survivorship. This means that the cash flows for the receive leg would be known and locked in at the outset of the swap, whereas the pay leg (the pension benefit payments) would be based on actual survivorship and only paid to the retired plan participants as long as they remained alive. This change would materially change the mortality risk embedded into the arrangement between DB plan trust and guarantor, mortality risk that wouldn't be present in a loan arrangement. The guarantor could choose to separately transfer some of this mortality risk to a reinsurer.

d. Death benefits and required collateral could be defined so that they are not equal to the cumulative pension benefits paid with interest. Instead, they could be defined so that they approximate that, but with some differences. This basis risk, i.e., the difference between the cumulative benefits paid with interest and what the guarantor ultimately receives back in the form of a death benefit, should help refute the argument that a loan exists between the DB plan trust and the guarantor. Furthermore, to the extent that the actual amount of death benefit received by the guarantor is significantly less than the cumulative benefits paid plus interest (as illustrated in FIG. 9 and discussed above), then the stronger the argument would be that no loan exists between guarantor and plan trust.

3. FIG. 13 illustrates a slight variation in the PARIS program with respect to the insurance coverage. Specifically, in this case the DB plan trust pays an extra premium to the insurer in exchange for a guarantee from the insurer that the policy won't lapse regardless of actual investment returns or mortality experience, as long as the plan pays some minimum schedule of insurance premiums over time. This guarantee is sometimes referred to as a "no lapse guarantee". The value of having such a guarantee is that the DB plan may be insulated from poor investment or mortality experience, which would ordinarily create a need for additional contributions. In a PARIS program, without such a guarantee, poor investment results might cause the insurance policy to lapse without additional insurance premium which could require greater plan contributions, whereas having such a guarantee would ensure the policy would remain in force as long as the minimum premiums had been paid. Taking this a step further, the benefit guarantor could reimburse the DB plan for the extra no lapse guarantee premium. Why might the guarantor be willing to do this? The no lapse guarantee premium may give the guarantor greater comfort that the policy will remain in force and lessen concern that the DB plan will run into financial difficulty. It may also help convince the DB plan sponsor to participate in the PARIS program, for the same reason that the plan would be less vulnerable to poor investment results.

4. FIG. 14 illustrates a more radical variation in the PARIS program. In this version, a) there would be no benefit guarantor, and b) the retired plan participants receive death benefits from the qualified DB plan, and c) the retirees pledge their death benefits in exchange for a series of loans which could serve as a substitute for the defined benefits that they might receive in a traditional plan. This version would require changes in the plan provisions, as well as education of the plan participants on the exchange provisions and the taxation under the program. The deductibility of loan interest under this version of PARIS would depend on the particular financial details of each plan participant who borrows under the program. While this version entails introducing complexity to the plan participants, it still has the tax benefits created by a split dollar insurance arrangement, but one less party to share them with.

5. Non-qualified plans could also benefit from a PARIS program. FIG. 15 illustrates one which is unfunded except for the purchase of insurance policies, the death benefits of which can be used in a similar manner as before. The mechanics of a non-qualified PARIS program could work similarly to a qualified one, but the lack of restrictions normally associated with a qualified plan could mean that the funding of the insurance policies may be less predictable and more lumpy or sporadic, and that the benefit guarantor 204 would be dealing directly with the plan sponsor 103 rather than the qualified DB plan trust (because a non-qualified DB plan has no such trust holding assets for the plan's benefit).

6. Terminated DB plans could also benefit from a PARIS program. In this case, the purchase of insurance may need to be made currently with respect to benefits that might not commence until some time in the future. Also, the cost of providing those benefits would need to be locked in today, given the lack of future contributions, so the guarantor would need to commit to providing future benefits based upon a certain level of funds and/or insurance policies available today. This might involve insurance policies with no lapse guarantees as discussed earlier, or policies that fully paid up today rather than with a stream of premiums over a period of years.

7. FIG. 16 illustrates the more general situation of an individual purchasing an annuity from an annuity provider 304, but where such annuity provider utilizes the PARIS methodology to fund the annuity benefit payments. As with the earlier situations involving defined benefit pension plans, the benefit provider would buy insurance policies with respect to each annuitant, and then enter into an exchange agreement with a benefit guarantor 204 who would agree to provide annuity payments in return for the ultimate death benefits on the lives of the individual annuitants 302.

Other embodiments of PARIS are certainly possible. They will all have the common elements of insurance protection which is shared via a split dollar insurance agreement, an exchange of pension benefits for death benefits, some form of financing of the pension benefits, all done a favorable after tax basis.

CONCLUSIONS, RAMIFICATIONS, AND SCOPE

Thus the reader will see that a PARIS program described herein has characteristics that could make traditional defined benefit plans obsolete! PARIS does this by introducing new elements and parties to the process of delivering defined benefits to plan participants in a way that creates value that can be shared amongst all the parties involved. PARIS utilizes techniques that have been used previously in other applications, but these techniques are combined in a unique way to create extraordinary value. Here are some of the unique attributes of a PARIS plan:

- The DB plan owning insurance policies resembles COLI, yet the plan gets no tax benefit (as a corporation normally would under COLI) as the plan trust is already a tax exempt vehicle.
- PARIS utilizes a split dollar insurance arrangement for the benefit of retirees rather than employees, as is the norm.
- The split dollar arrangement is between two corporate entities and not any individuals, as is the norm.
- The increasing death benefits increase the tax benefits associated with split dollar insurance agreements, which would normally provide for level insurance amounts.
- Tax deductible loans are used to finance the purchase of the tax advantaged split dollar coverage
- Low risk death benefits are used to collateralize and lower the cost of PARIS financing
- PARIS DB plans are able to employ financial leverage to improve its economics, without actually directly borrowing.
- PARIS contracts can be formed in such a way as to shift value between the various parties to achieve an appropriate balance.
- PARIS programs could be aborted after almost any period of time and still generate value for all the parties involved, which preserves flexibility for the participants, thereby reducing the risk of participation in the first place.

The significant value that can be created for a DB plan can be enough to ward off potential plan terminations and turn otherwise tenuously funded plans into ones that are financially healthy again, improving the prospects for the plan sponsor delivering on the promises they have made to employees over many years. It is hard to overstate the importance that a PARIS program could take on, given the perceived value of DB plans across Corporate America.

While the above description contains many specificities, these should not be construed as limitations on the scope of the invention, but rather an exemplification of one preferred embodiment thereof. Many variations are possible. The Additional Embodiments section above described some of the potential variations that might be deemed improvements over other embodiments, and there are undoubtedly others that could add more value under the appropriate set of circumstances.

Accordingly, the scope of the invention should be determined not by the embodiment(s) illustrated, but by the appended claims and their legal equivalents.

I claim:

1. A method of funding any portion of a series of defined benefit pension plan payments to plan participants which sponsor of said pension plan is obligated to make, said funding occurring within a plan trust qualified for federal income tax purposes, or otherwise similarly tax advantaged, comprising:

(a) a purchase and funding of one or more cash value life insurance policies from one or more life insurance companies on each said plan participant by said plan trust, (b) a collateralized exchange between said plan trust and a facilitating entity of some portion of the death benefits from each said insurance policy on each said participant to said facilitating entity in return for a series of life contingent payments to said plan trust with respect to each said participant for which said plan sponsor has said obligations, with said collateralized exchange taking the form of two separate agreements comprising, i. a collateralized annuity, swap or notional principal contract via which life contingent payments in respect of said plan participants are conveyed to said plan trust, and ii. a split dollar arrangement, or any option on part of plan trust or facilitating entity to enter into such split dollar arrangement with the other respective party, via which said portions of death benefits are conveyed to said facilitating entity, and (c) a computerized financial model which uses as input various assumptions that might have baring on the financial consequences of said funding method on said plan sponsor, plan trust, life insurer(s), and facilitating entity, and produces as output the expected economic impact of said funding method on said plan sponsor, plan trust, life insurer(s), and facilitating entity given any specific combination of said input assumptions, whereby said purchase of said insurance policies will result in financial leverage for said plan trust by virtue of additional funds being provided to it by said facilitating entity, and the expectation of plan trust earning greater investment returns on said additional funds than the cost of said funds that is embodied in the said portion of death benefits which said plan trust will pay to said facilitating entity as part of said collateralized exchange, with the resulting net financial benefit to said plan trust being quantified by said computerized financial model for any given combination of said input assumptions, and whereby current federal taxation of said collateralized exchange is expected to result in a material deferral of taxes, and therefore a lower present value of taxes, to said facilitating entity in certain plausible economic scenarios which can be identified, tested and quantified by said computerized financial model, and whereby current federal taxation of said collateralized exchange offers a further reduction of present value of taxes paid by said facilitating entity by use of alternative mortality rates that the IRS permits for the calculation of the economic benefits provided under a split dollar arrangement and which implicitly deem the taxable value of death benefit coverage to be less than the actual value of death benefits expected to be realized based upon the assumed mortality rates for said insured plan participants, both death benefit values of which could be estimated and quantified by said computerized financial model for any given combination of said input assumptions, including said alternative mortality rates, and whereby said collateralized exchange can be customized by the exact portion of said death benefits to be conveyed to said facilitating entity, with each incremental reduction in said portion so conveyed, and thereby retained by said plan trust, resulting in greater net value being conveyed from said facilitating entity to said plan trust and thus available to pay said pension plan payments, as so evidenced by output produced by said computerized financial model for any combination of said input assumptions including said portion of said death benefits so conveyed, and whereby said financial leverage, deferral of federal taxes, reduction in federal taxes, and conveyance of value from said facilitating entity to said plan trust can be expected, in combination, to result in increased net financial value to both said facilitating entity and plan trust as evidenced by output produced by said computerized financial model for certain plausible sets of said input assumptions, thereby increasing the viability of said plan sponsor and facilitating entity agreeing to said method of funding said series of pension plan payments to said plan participants and then, once said funding method is so implemented, increasing the probability of said obligations being paid in full by said plan sponsor.

2. The method of claim 1 (c) wherein said computerized financial model provides for the explicit recognition of input assumptions and parameters comprising:
  (a) with respect to said plan sponsor: benefit commencement age, sex, and assumed mortality rates of said participants, annual amount and cost of living adjustments for said plan benefits, and current plan trust balances in respect of said participants,
  (b) with respect to said insurance policies purchased: face amount as a percent of cumulative benefits provided to date, death benefit type (face or face plus account value), premium/face amount ratio, premium years, premium loads, expense charges, credited rate spreads, cost of insurance margins, surrender charges, surrender rates, no lapse guarantee availability, no lapse guaranty premium, insurer investment earnings rate, insurer marginal federal tax rate, and actual mortality rates of said insured participants,
  (c) with respect to said facilitating entity and its respective agreements: its marginal federal tax rate, the percentage of death benefits received by said plan trust and so conveyed to said facilitating entity via said split dollar arrangement, mortality rates applicable for determination of economic benefit under said split dollar arrangements, discount rate for present valuing future cash flows, deductibility percentage of interest payments, if any, interest rate charged by any lender to the facilitating entity for borrowed funds, if any, the risk free rate for invested funds, the amount of any reserves required to be establish by said facilitating entity as part of said annuity, swap or notional principal contract, and deductibility of said reserves by said facilitating entity for federal income tax purposes.

* * * * *